United States Patent
Moriuchi et al.

(10) Patent No.: US 9,435,883 B2
(45) Date of Patent: Sep. 6, 2016

(54) ANTENNA, RADAR APPARATUS AND SIGNAL PROCESSING METHOD

(71) Applicant: FUJITSU TEN LIMITED, Kobe-shi, Hyogo (JP)

(72) Inventors: Takumi Moriuchi, Kobe (JP); Eisuke Hayakawa, Kobe (JP)

(73) Assignee: FUJITSU TEN LIMITED, Hyogo (JP)

( * ) Notice: Subject to any disclaimer, the term of this patent is extended or adjusted under 35 U.S.C. 154(b) by 87 days.

(21) Appl. No.: 14/278,873

(22) Filed: May 15, 2014

(65) Prior Publication Data

US 2015/0057833 A1 Feb. 26, 2015

(30) Foreign Application Priority Data

Aug. 26, 2013 (JP) ................................. 2013-174905

(51) Int. Cl.

| G01S 13/00 | (2006.01) |
|---|---|
| G01S 13/06 | (2006.01) |
| B60W 50/00 | (2006.01) |
| H01Q 21/06 | (2006.01) |
| H01Q 1/32 | (2006.01) |
| H01Q 3/24 | (2006.01) |
| G01S 13/93 | (2006.01) |
| G01S 7/03 | (2006.01) |
| G01S 13/34 | (2006.01) |

(52) U.S. Cl.
CPC ............... *G01S 13/06* (2013.01); *B60W 50/00* (2013.01); *G01S 7/03* (2013.01); *G01S 13/345* (2013.01); *G01S 13/931* (2013.01); *H01Q 1/3233* (2013.01); *H01Q 1/3258* (2013.01); *H01Q 3/24* (2013.01); *H01Q 21/06* (2013.01)

(58) Field of Classification Search
CPC ...... G01S 13/931; G01S 7/03; G01S 13/345; H01Q 3/26
USPC ...................................... 342/70, 81
See application file for complete search history.

(56) References Cited

U.S. PATENT DOCUMENTS

2009/0251362 A1* 10/2009 Margomenos .......... G01S 7/032
342/175
2012/0229328 A1* 9/2012 Aizawa ................... G01S 13/44
342/149

FOREIGN PATENT DOCUMENTS

| JP | A-11-287857 | 10/1999 |
|---|---|---|
| JP | 2013-113644 A | 6/2013 |
| JP | 2013113644 A * | 6/2013 |
| WO | 03034087 A2 | 4/2003 |
| WO | 2013/053467 A1 | 4/2013 |

OTHER PUBLICATIONS

Sep. 7, 2015 Office Action issued in German Patent Application No. 10 2014 209 490.9.
Jul. 4, 2016 Office Action issued in Chinese Application No. 201410426083.0.

* cited by examiner

*Primary Examiner* — Tuan C. To
*Assistant Examiner* — Isaac Smith
(74) *Attorney, Agent, or Firm* — Oliff PLC

(57) ABSTRACT

There is provided an antenna. A third transmission antenna is provided at a position shifted in a short direction of a first transmission antenna. A second transmission antenna is provided at a position between the first and third transmission antennas so that a portion of the second transmission antenna in a longitudinal direction is overlapped with a portion of the first and third transmission antennas in the longitudinal direction. A fourth transmission antenna is provided at a position point-symmetrical with respect to the position of the second transmission antenna, about the position of the third transmission antenna. A plurality of reception antennas are provided so that a portion of each of the reception antennas in the longitudinal direction is overlapped with a portion of the second transmission antenna in the longitudinal direction.

8 Claims, 15 Drawing Sheets

FIG. 14
DERIVATION OF HORIZONTAL ANGLE (FIRST PERIOD Tx10)
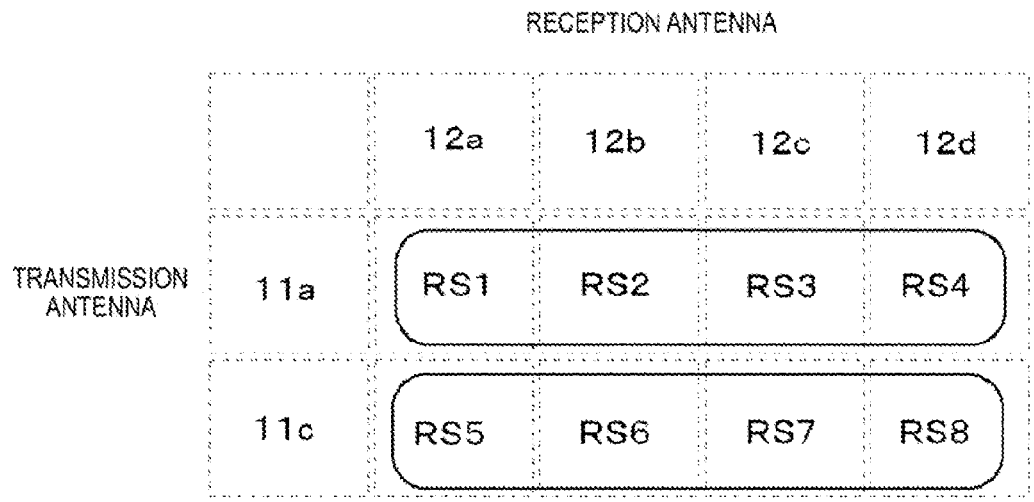
DERIVATION OF HORIZONTAL ANGLE (SECOND PERIOD Tx11)
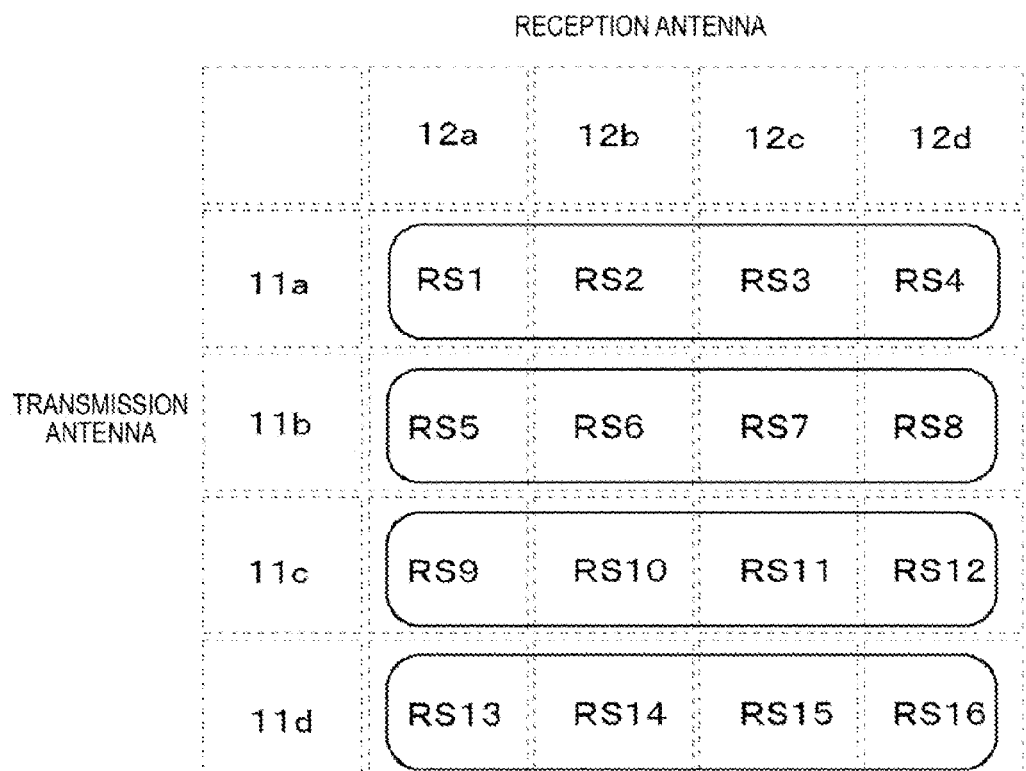

ANTENNA, RADAR APPARATUS AND SIGNAL PROCESSING METHOD

CROSS-REFERENCE TO RELATED APPLICATIONS

This application is based on and claims priority from Japanese Patent Application No. 2013-174905 filed on Aug. 26, 2013.

TECHNICAL FIELD

The present invention relates to an antenna capable of outputting a transmission wave.

BACKGROUND

In the past, a vehicle-mounted radar apparatus derives a position of a target. The derivation of the position of the target is performed as follows. A transmission wave outputted from a transmission antenna of the radar apparatus is reflected from the target. A reflection wave reflected from the target is received by a reception antenna of the radar apparatus.

The radar apparatus derives a distance (hereinafter referred to as a vertical distance) of the target with respect to the radar apparatus based on a time difference until the reflection wave is received after the transmission wave is outputted. Further, the radar apparatus derives a vehicle width distance (hereinafter referred to as a horizontal distance) of the target and the radar apparatus based on an angle of the target with respect to the radar apparatus. That is, the radar apparatus derives a position of a horizontal direction of the target with respect to a road surface from the vertical distance and the horizontal distance of the target. Further, the radar apparatus derives a relative speed of the other vehicle with respect to the vehicle.

The target derived by the radar apparatus is, for example, the other vehicle (hereinafter referred to the other vehicle) existing at the substantially same height as the vehicle in a direction perpendicular to the road surface. The radar apparatus outputs the position of the target in a horizontal direction and the relative speed to a vehicle control device. As a result, the vehicle control device performs various vehicle controls based on the position of the target in a horizontal direction and the relative speed.

The vehicle control device performs plural types of vehicle controls. An example of the vehicle control includes ACC (Adaptive Cruise Control) control and PCS (Pre-Crash Safety System) control. The ACC control is a control of driving the vehicle CR to follow up the other vehicle (hereinafter referred to as a preceding vehicle) driving ahead the vehicle in a state in which a given inter-vehicular distance between the vehicle and the preceding vehicle is retained. The PCS control is a control of protecting a passenger of the vehicle against an impact when collision occurs.

Since the vehicle control device is primarily intended to follow up the preceding vehicle in order to perform the ACC control, the radar apparatus preferably performs distant beam radiation at a relatively narrow angle. For example, it is required to output the transmission wave in a transmission range within a predetermined vertical distance (within about 150 m of vertical distance) while the horizontal distance is within a self-lane (within about ±1.8 m of horizontal distance). The about ±1.8 m of the horizontal distance is a distance of the self-lane in the vehicle width direction. In other words, it is a distance of the vehicle width direction in which the width of the self-lane is set to about 3.6 m and the position of the radar apparatus is set to ±0 m of the horizontal direction.

Further, since it is necessary to detect a possibility of collision against an object positioned obliquely in front of the vehicle, as well as facing directly forward, to allow the vehicle control device to perform the PCS control on the vehicle, the radar apparatus preferably performs a close-range beam radiation in the relatively wide range. For example, it is required to output the transmission wave in the transmission range within the predetermined vertical distance (within about 80 m of vertical distance) while the horizontal distance is within about ±7.2 m. About ±7.2 m of the horizontal distance is a distance of the vehicle width direction including the self-lane and any one of left and right traffic lanes adjacent to the self-lane. In other words, it is a distance of the vehicle width direction in which each width of the traffic lane adjacent to the self-lane is set to about 3.6 m, and the position of the radar apparatus is set to ±0 m of the horizontal distance.

Also, the radar apparatus may derive the vertical distance and the horizontal distance of a substance (e.g., a sign) above a road having a certain height (e.g., about 4.5 m) in a direction perpendicular to the road surface, except for the other vehicle on the road surface. If the substance above the road is derived, the radar apparatus outputs the position of the horizontal direction and the relative speed to the vehicle control device. As a result, in a case where the vertical distance of the substance above the road with respect to the vehicle is equal to or less than a predetermined distance, the vehicle control device may perform the PCS control, for example. However, the substance above the road is a target having a little risk of collision against the vehicle even though the vertical distance with respect to the vehicle is shorter. For this reason, the substance above the road is a target having no necessity for the vehicle control by the vehicle control device. Therefore, the radar apparatus is required to derive an angle of the target in a direction perpendicular to the road surface to discriminate the target and the target having a certain height in direction perpendicular to the road surface.

In the case where the vehicle control device performs plural types of vehicle controls, a transmission range suitable for each control is required. For this reason, the antenna of the radar apparatus is necessarily provided with a plurality of transmission antennas having different transmission ranges. Further, in a case where the radar apparatus derives the angle of the target in the horizontal direction and the vertical direction with respect to the road surface, the reception antenna is considered to be arranged in the horizontal direction and the vertical direction with respect to a substrate surface of a dielectric substrate. In this instance, a technique for the arrangement of the reception antenna is disclosed in Patent Document 1.

Patent Document 1: Japanese Patent Application Publication No. H11-287857A

However, the number of the reception antennas provided in the antenna of the radar apparatus is increased to derive the angle of the target in the horizontal direction and the vertical direction with respect to the road surface, thereby remarkably increasing an area of the antenna in which the transmission antenna and the reception antenna are arranged. Further, in the case of increasing the number of the transmission antennas to allow the vehicle control device to perform plural types of vehicle controls, the area of the antenna is further increased.

With the increase in area of the antenna, the radar apparatus itself including the antenna is increased in size. If the radar apparatus grows in size, it is difficult to mount the radar apparatus to a limited mounting space of the vehicle.

SUMMARY

An object of the present invention is to provide a technique for downsizing a radar apparatus.

(1) According to a first aspect of the embodiments of the present invention, there is provided an antenna including a plurality of transmission antennas and a plurality of reception antennas, the antenna comprising: a first transmission antenna; a third transmission antenna provided at a position shifted in a short direction of the first transmission antenna; a second transmission antenna provided at a position between the first transmission antenna and the third transmission antenna so that a portion of the second transmission antenna in a longitudinal direction is overlapped with a portion of the first and second transmission antennas in the longitudinal direction; a fourth transmission antenna provided at a position point-symmetrical with respect to the position of the second transmission antenna, about the position of the third transmission antenna: and the plurality of reception antennas provided so that a portion of each of the reception antennas in the longitudinal direction is overlapped with a portion of the second transmission antenna in the longitudinal direction.

(2) The first transmission antenna and the third transmission antenna may output a transmission wave of a first range, and the second transmission antenna and the fourth transmission antenna may output a transmission wave of a second range of which a horizontal angle is narrower than that of the first range.

(3) According to a second aspect of the embodiments of the present invention, there is provided a radar apparatus including the above-described antenna, the radar apparatus comprising: a first deriving unit configured to derive a position of a target in a horizontal direction with respect to a road surface based on reflection waves of transmission waves outputted from the first transmission antenna and the third transmission antenna, from the target; and a second deriving unit configured to derive a height of the target in a vertical direction with respect to the road surface based on reflection waves of transmission waves outputted from the second transmission antenna, the third transmission antenna and the fourth transmission antenna, from the target.

(4) A first period including a period to output the transmission waves from the first transmission antenna and the third transmission antenna in order, and a second period including a period to output the transmission waves from the first transmission antenna, the second transmission antenna, the third transmission antenna, and the fourth transmission antenna in order may be set to one cycle of a process of deriving the position of the target in the horizontal position and the height of the target in the vertical direction, the first deriving unit may derive the position of the target in the horizontal direction based on the reflection waves from the target during the first period and the second period, and the second deriving unit may derive the height of the target in the vertical direction based on the reflection waves from the target during the second period.

(5) According to a third aspect of the embodiments of the present invention, there is provided a vehicle control system capable of controlling a vehicle, comprising: the above-described radar apparatus; and a vehicle control device configured to control the vehicle based on target information outputted from the radar apparatus.

(6) According to a fourth aspect of the embodiments of the present invention, there is provided a signal processing method of deriving a position of a target by a reflection wave received with a plurality of reception antennas provided on a substrate surface of a dielectric substrate, the signal processing method comprising: outputting a transmission wave by an antenna including a plurality of transmission antennas and the plurality of reception antennas, with using a first transmission antenna, a third transmission antenna provided at a position shifted in a short direction of the first transmission antenna, a second transmission antenna provided at a position between the first transmission antenna and the third transmission antenna so that a portion of the second transmission antenna in a longitudinal direction is overlapped with a portion of the first and second transmission antennas in the longitudinal direction, and a fourth transmission antenna provided at a position point-symmetrical with respect to the position of the second transmission antenna, about the position of the third transmission antenna; receiving the reflection wave with using the plurality of reception antennas provided so that a portion of each of the reception antennas in the longitudinal direction is overlapped with a portion of the second transmission antenna in the longitudinal direction; deriving a position of the target in a horizontal direction with respect to a road surface, based on reflection waves of transmission waves outputted from the first transmission antenna and the third transmission antenna from the target; and deriving a height of the target in a vertical direction with respect to the road surface, based on reflection waves of transmission waves outputted from the second transmission antenna, the third transmission antenna and the fourth transmission antenna from the target.

According to the configuration set forth in (1), since the transmission antennas are provided in a stair shape in the vertical direction, and the reception antennas are provided at the position to be overlapped with a portion of the second transmission antenna, the transmission antenna for outputting the transmission wave with the phase difference in the direction perpendicular to the mad surface, and the reception antennas receiving the reflection wave with the phase difference in the horizontal direction to the road surface are provided in one antenna. As a result, the angle of the horizontal direction and the vertical direction can be derived without increasing an area of the antenna of the radar apparatus, thereby downsizing the radar apparatus.

According to the configuration set forth in (2), since the horizontal angle of the transmission range for the respective transmission antennas is set to an angle of different size, it is possible to output the transmission wave to derive the target information respectively required for plural kinds of vehicle controls, thereby further downsizing the antenna.

According to the configuration set forth in (3), since the plurality of transmission antennas are combined for both processes of deriving the position of the target in the horizontal direction to the road surface and the height of the target in the vertical direction, it is possible to decrease the number of the transmission antennas provided in the antenna. As a result, the radar apparatus can derive the position of the target in the horizontal direction to the road surface and the height of the target in the vertical direction by the relatively compact antenna.

According to the configuration set forth (4), since the position of the target in the horizontal direction is derived in the first period and the second period, and the height of the target is derived in the second period, it is possible to early derive a variation in position of the target in the horizontal direction, as comparison with a variation in height of the target in the vertical direction.

Further, according to the configuration set forth in (5), since the vehicle control device controls the vehicle based on the target information outputted from the radar apparatus, it is possible to perform the proper vehicle control according to the target information, among plural kinds of vehicle controls.

BRIEF DESCRIPTION OF THE DRAWINGS

In the accompanying drawings:

FIG. 14 is a table illustrating receiving signals corresponding to each transmission antenna and each reception antenna in first and second periods;

DETAILED DESCRIPTION OF THE EMBODIMENTS

Hereinafter, embodiments of the present invention will now be described with reference to the accompanying drawings.

<First Embodiment>
<1. View of Overall Vehicle>

Figure 1:
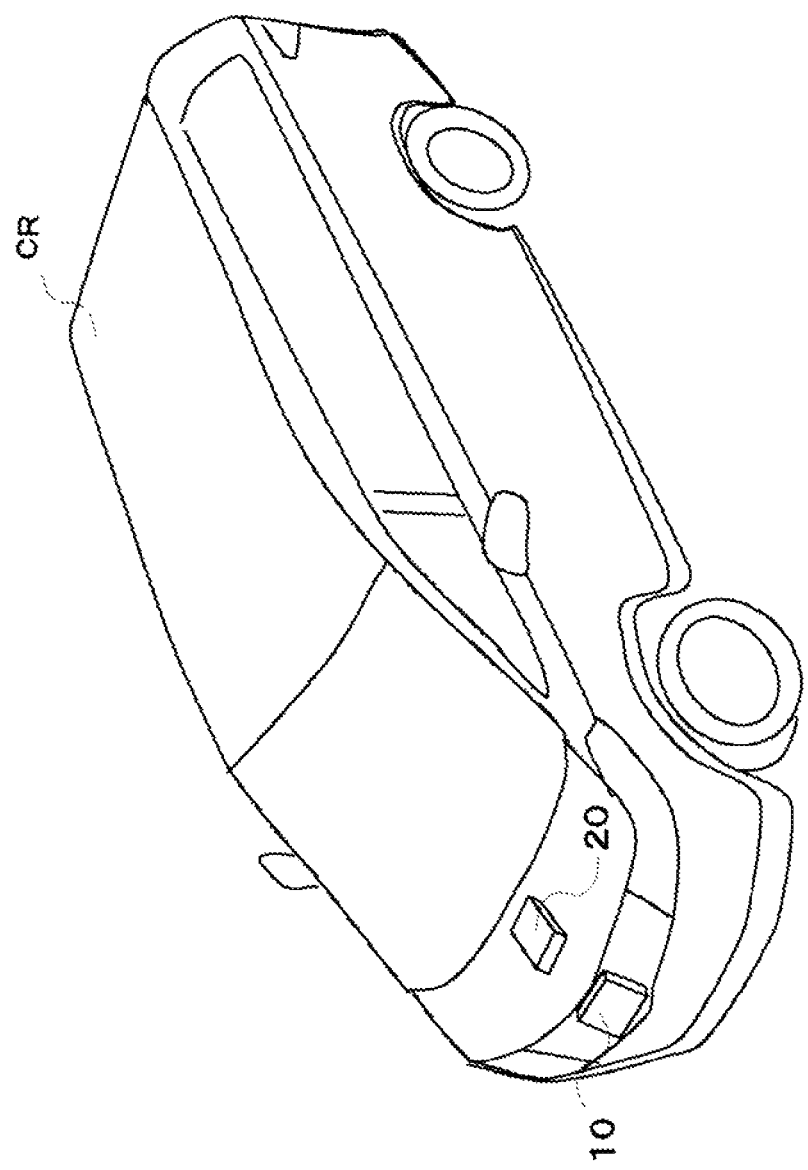
FIG. 1 is a diagram of an overall vehicle.

FIG. 1 is a view of an overall vehicle CR. The vehicle CR usually includes a radar apparatus 10 and a vehicle control device 20 which are provided in a vehicle control system 1 described below. The vehicle CR includes a radar apparatus 10 near a bumper in front of the vehicle CR. The radar apparatus 10 scans a given range of a horizontal direction to a road surface and a vertical direction to the road surface through once scanning. As a result, the radar apparatus 10 derives information (hereinafter referred to as target information) including a position (vertical and horizontal distances) of a target with respect to the road surface, a height of the target with respect to the road surface, and a relative speed of the target with respect to the CR. The process of deriving the target information by the radar apparatus 10 will be described later in detail. The vehicle control device 20 is installed in the vehicle CR. The vehicle control device 20 is an ECU (Electronic Control Unit) for controlling each device of the vehicle CR.

<2. System Block Diagram>

Figure 2:
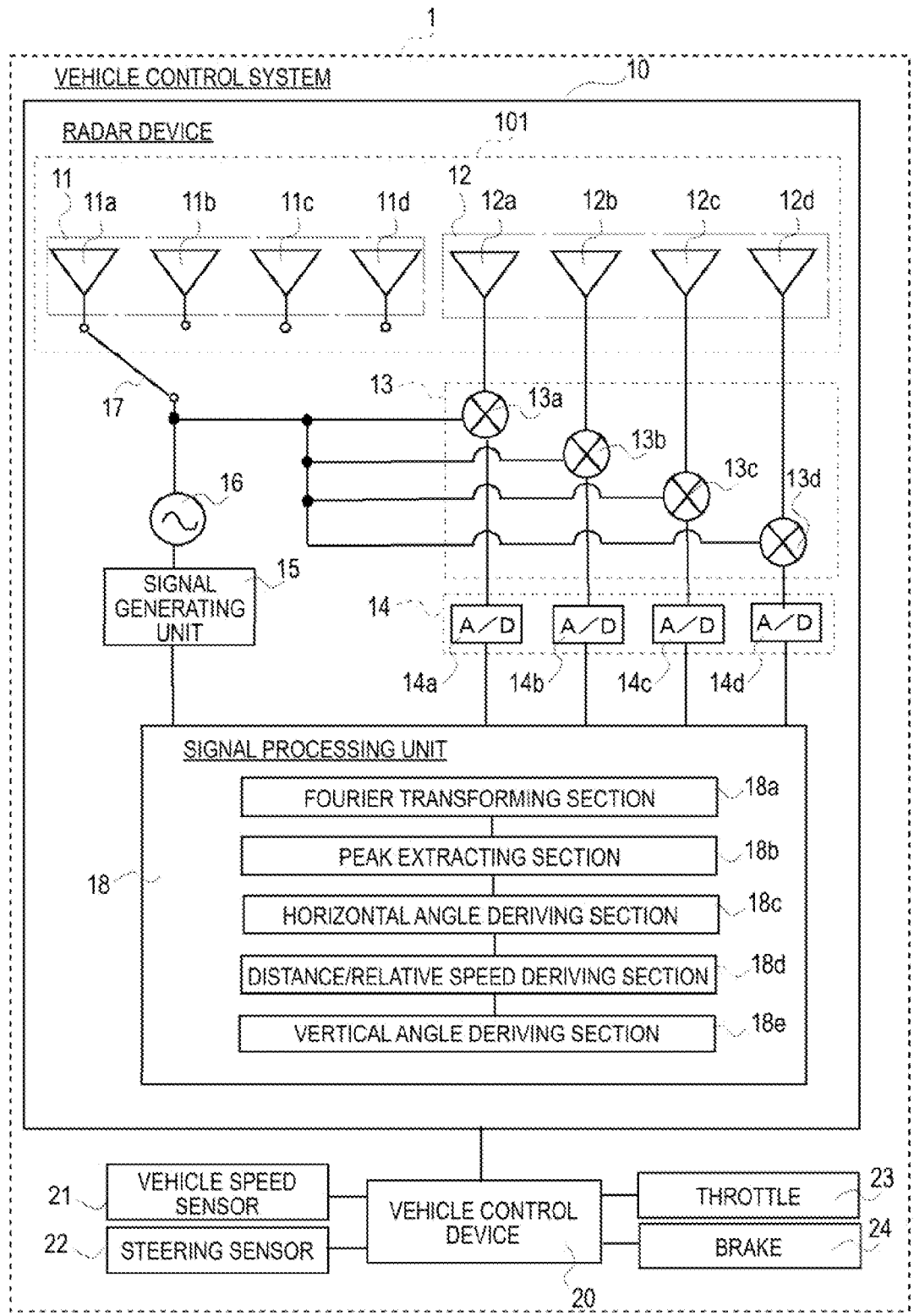
FIG. 2 is a block diagram of a vehicle control system.

FIG. 2 is a block diagram of the vehicle control system 1. The vehicle control system 1 is a system capable of controlling behavior of the vehicle CR. The vehicle control system 1 includes the radar apparatus 10, the vehicle control device 20, a vehicle speed sensor 21, a steering sensor 22, a throttle 23, and a brake 24. The radar apparatus 10 and the vehicle control device 20 are electrically connected to each other. The vehicle control device 20 is electrically connected to the vehicle speed sensor 21, the steering sensor 22, the throttle 23, and the brake 24.

The vehicle control device 20 performs at least one vehicle control among plural types of vehicle controls according to a traveling situation of the vehicle CR. An example of the vehicle control includes ACC (Adaptive Cruise Control) control and PCS (Pre-Crash Safety System) control. The vehicle control device 20 controls the vehicle CR to follow up a preceding vehicle within a self-lane in which the vehicle CR travels. Specifically, the vehicle control device 20 controls at least one of the throttle 23 and the brake 24 according to the travel of the vehicle CR. Further, the vehicle control device 20 drives the vehicle CR to follow up the preceding vehicle in a state in which a given inter-vehicular distance between the vehicle and the preceding vehicle is retained. The ACC control is to drive the vehicle CR to follow up the preceding vehicle in the state in which the given inter-vehicular distance between the vehicle and the preceding vehicle is retained.

Further, the vehicle control device 20 protects a passenger of the vehicle CR against collision between the vehicle CR and the other vehicle. Specifically, if there is a possibility that the vehicle CR collides with the other vehicle, for example, the vehicle CR is controlled as follows. The vehicle control device 20 gives a warning the passenger of the vehicle CR against the collision using an alarm device (not illustrated). The vehicle control device 20 fixes the passenger to a seat by means of a seat belt in a cabin. As a result, even in the case where the vehicle CR collides against the other vehicle, the impact to the passenger of the vehicle CR is reduced. In this way, the PCS control is to protect the passenger of the vehicle CR.

The vehicle speed sensor 21 outputs a signal according to the speed of the vehicle CR to the vehicle control device 20 based on a rotational speed of an axle of the vehicle CR. The vehicle control device 20 derives a current speed of the vehicle CR based on the signal from the vehicle speed sensor 21.

The steering sensor 22 derives a steering angle of a steering wheel which is operated by a driver of the vehicle CR. As a result, the steering sensor 22 outputs the information about an angle of a vehicular body of the vehicle CR to the vehicle control device 20. The vehicle control device 20 derives a value of a curve radius of the self-lane, in which the vehicle CR travels, based on the information acquired from the steering sensor 22.

The throttle 23 accelerates the speed of the vehicle CR by operation of the driver of the vehicle CR. Further, the throttle 23 accelerates the speed of the vehicle CR by the control of the vehicle control device 2. For example, the throttle 23 accelerates the speed of the vehicle CR to maintain the vertical distance between the vehicle CR and the preceding vehicle at a constant distance.

The brake 24 decelerates the speed of the vehicle CR by the operation of the driver of the vehicle CR. Further, the brake 24 decelerates the speed of the vehicle CR by the control of the vehicle control device 2. For example, the brake 24 decelerates the speed of the vehicle CR to maintain the vertical distance between the vehicle CR and the preceding vehicle at a constant distance.

Next, the radar apparatus 10 will be described. The radar apparatus 10 includes an antenna 101, a mixer 13 (13a to 13d), an AD (Analog/Digital) converter 14 (14a to 14d), a signal generating unit 15, an oscillator 16, a switch 17, and a signal processing unit 18.

The antenna 101 has a transmission antenna 11 and a reception antenna 12. The transmission antenna 13 consists of four antennas, i.e., transmission antennas 11a, 11b, 11c and 11d. The transmission antenna 11 is switched in a given period by switching of the switch 17. As a result, at least one of four transmission antennas outputs the transmission wave.

The reception antenna 12 consists of four antennas, i.e., reception antennas 12a, 12b, 12c and 12d. Four antennas receive the reflection wave from the target.

<2-1. Antenna Configuration>

Figure 3:
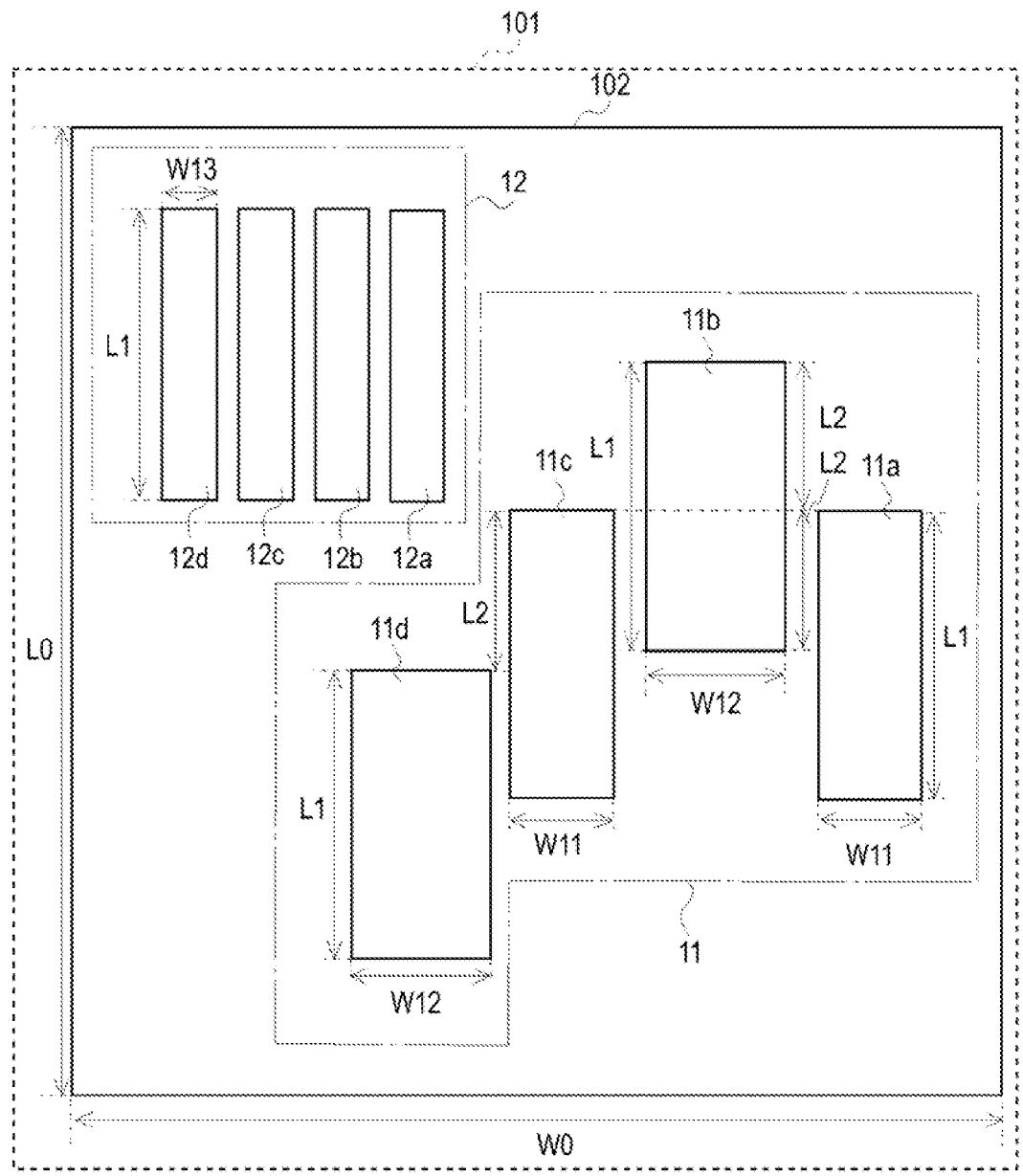
FIG. 3 is a diagram illustrating a configuration of an antenna.

Overall configuration of the antenna 101 will be now described with reference to FIG. 3. FIG. 3 is a diagram explaining the configuration of the antenna 101. FIG. 3 describes a direction using axes of X and Y coordinates. The axes of X and Y coordinates are relatively fixed to at least one of the transmission antenna 11 and the reception antenna 12. A short direction (hereinafter referred to as a short direction) of the transmission antenna 11 and the reception antenna 12 installed on the substrate surface of the dielectric substrate 102 corresponds to an X-axis direction. A longitudinal direction (hereinafter referred to as a longitudinal direction) of the transmission antenna 11 and the reception antenna 12 corresponds to a Y-axis direction.

The antenna 101 has the transmission antenna 11 and the reception antenna 12 which are installed on the substrate surface of the dielectric substrate 102. The dielectric substrate 102 is a substantially square substrate having a width W0 (e.g., about 6.0 cm) in the short direction (X-axis direction) and a length L0 (e.g., about 6.0 cm) in the longitudinal direction (Y-axis direction).

Next, the respective transmission antennas 11a to 11d of the transmission antenna 11 will be described. The respective transmission antennas 11a to 11d has antenna elements provided to a plurality of transmission lines (not illustrated). The transmission line of the transmission antenna 11 transmits the transmitting signal to the antenna element. The antenna element outputs the transmission wave based on the transmitting signal.

The transmission antenna 11a is installed at a position of a right side (+X side) to face the substrate surface of the dielectric substrate 102 in the short direction (X-axis direction), and at a position substantially near a center of the dielectric substrate 102 in the longitudinal direction (Y-axis direction). In other words, the transmission antenna 11a is provided at the substantially center of a right end portion of the dielectric substrate 102. The transmission antenna 11a is a substantially rectangular antenna having a width W11 (e.g., about 0.6 cm) in the short direction (X-axis direction) and a length L1 (e.g., about 1.8 cm) in the longitudinal direction (Y-axis direction).

The transmission antenna 11b is provided between the transmission antenna 11a and the transmission antenna 11c described later. The transmission antenna 11b is installed at a position of a left side (−X side) of the transmission antenna 11a to face the substrate surface of the dielectric substrate 102 in the short direction (X-axis direction). In other words, the transmission antenna 11b is provided at a position near the transmission antenna 11a in the short direction (X-axis direction).

Further, the transmission antenna 11b is provided at a position of an upper side (+y side) more than the transmission antenna 11a to face the substrate surface of the dielectric surface 102 in the longitudinal direction (Y-axis direction). In other words, the transmission antenna 11b is provided at a position to be overlapped with a portion of the transmission antenna 11a in the longitudinal direction (Y-axis direction).

The transmission antenna 11b is a substantially rectangular antenna having a width W12 1 (e.g., about 1.0 cm) in the short direction (X-axis direction) and a length L1 (e.g., about 1.8 cm) in the longitudinal direction (Y-axis direction). The transmission antenna 11b is provided at a position of an upper side (+Y side), by a length 2 (e.g., about 0.9 cm) with respect to the transmission antenna 11a in the longitudinal direction (Y-axis direction), to face the substrate surface of the dielectric surface 102.

The transmission antenna 11c is installed at a position of a left side (−X side) of the transmission antenna 11b to face the substrate surface of the dielectric substrate 102 in the short direction (X-axis direction). In other words, the transmission antenna 11c is provided at a position near the transmission antenna 11b in the short direction (X-axis direction).

Further, the transmission antenna 11c is provided at a position of a lower side (−Y side) more than the transmission antenna 11b to face the substrate surface of the dielectric surface 102 in the longitudinal direction (Y-axis direction). In other words, the transmission antenna 11c is provided at a position to be overlapped with a portion of the transmission antenna 11b in the longitudinal direction (Y-axis direction).

The transmission antenna 11c is a substantially rectangular antenna having a width W11 (e.g., about 0.6 cm) in the short direction (X-axis direction) and a length L1 (e.g., about 1.8 cm) in the longitudinal direction (Y-axis direction). That is, the transmission antenna 11c is an antenna having the substantially same shape as the transmission antenna 11a. In this instance, to take measures for folding of a phase when a horizontal angle is derived, which will be described below, the transmission antennas 11a and 11c are arranged so that the output direction of the transmission wave is displaced to the left and right sides in the horizontal direction. The transmission antenna 11c is provided at a position of a lower side (−Y side), by a length L2 (e.g., about 0.9 cm) with respect to the transmission antenna 11b in the longitudinal direction (Y-axis direction), to face the substrate surface of the dielectric surface 102. The length L2 is substantially half of the length L1 of the transmission antenna 11b.

In this instance, the transmission antenna 11c is provided at a position moved from the position of the transmission antenna 11a to the substrate surface of the dielectric substrate 102 in the short direction (X-axis direction).

The transmission antenna 11d is installed at a position of a left side (−X side) of the transmission antenna 11c to face the substrate surface of the dielectric substrate 102 in the short direction (X-axis direction). In other words, the transmission antenna 11d is provided at a position near the transmission antenna 11c in the short direction (X-axis direction).

Further, the transmission antenna 11d is provided at a position of a lower side (−Y side) more than the transmission antenna 11c to face the substrate surface of the dielectric surface 102 in the longitudinal direction (Y-axis direction). In other words, the transmission antenna 11d is provided at a position to be overlapped with a portion of the transmission antenna 11c in the longitudinal direction (Y-axis direction).

The transmission antenna 11d is a substantially rectangular antenna having a width W12 (e.g., about 1.0 cm) in the short direction (X-axis direction) and a length L1 (e.g., about 1.8 cm) in the longitudinal direction (Y-axis direction). The transmission antenna 11d is provided at a position of a lower side (−Y side), by a length L2 (e.g., about 0.9 cm) with respect to the transmission antenna 11c in the longitudinal direction (Y-axis direction), to face the substrate surface of the dielectric surface 102. The length L2 is substantially half of the length L1 of the transmission antenna 11c.

Further, the transmission antenna 11d is installed at a position symmetrical to the transmission antenna 11b, with the position of the transmission antenna 11c being a center position of symmetry, in view of a rotational relation between the transmission antenna 11b and the transmission antenna 11d. Therefore, the radar apparatus 10 can include the plurality of transmission antennas of the longitudinal direction (Y-axis direction), without increasing the area of the antenna 101.

The four transmission antennas 11a to 11d are provided in a stair shape of 3 steps in the left side and 2 steps in the right side in the longitudinal direction (Y-axis direction). In other words, the four transmission antennas 11a to 11d are provided in an reversed-L letter with left and right sides reversed. Therefore, a phase difference corresponding to deviation of the longitudinal direction (Y-axis direction) occurs among the transmission wave outputted from the transmission antenna 11b, the transmission wave outputted from the transmission antenna 11c, and the transmission wave outputted from the transmission antenna 11d. As a result, the radar apparatus 10 can output the transmission wave to derive the height of the target in a direction perpendicular to the road surface.

Each of the reception antennas 12a to 12d of the reception antenna 12 will be described. The respective reception antennas 12a to 12d has antenna elements provided to a plurality of transmission lines (not illustrated). The antenna element of the reception antenna 12 receives the reflection wave to output the receiving signal to the transmission lines.

The reception antenna 12 is provided on the substrate surface of the dielectric substrate 102. The reception antenna 12 consists of four antennas, i.e., reception antennas 12a, 12b, 12c and 12d. The respective reception antennas 12a to 12d are antennas of a substantially rectangular antenna having a width W13 (e.g., about 0.5 cm) in the short direction (X-axis direction) and a length L1 (e.g., about 1.8 cm) in the longitudinal direction (Y-axis direction). The reception antenna 12 is installed at a position of a left side (−X side) to face the dielectric substrate 102 in the short direction (X-axis direction). Further, the reception antenna 12 is installed at a position of an upper side (+y side) to face the dielectric substrate 102 in the longitudinal direction (Y-axis direction). In other words, the reception antenna 12 is provided at a left upper end of the dielectric substrate 102.

The respective receiving antennas 12a to 12d of the reception antenna 12 is installed at a position adjacent to each other in the short direction (X-axis direction). Further, the respective receiving antennas 12a to 12d is installed at the same position in the longitudinal direction (Y-axis direction). The respective receiving antennas 12a to 12d is installed at a position overlapped with a portion of the reception antenna 11b in the longitudinal direction (Y-axis direction). In other words, the respective receiving antennas 12a to 12d is disposed in a stepped dead space consisting of three reception transmission antennas 11b to 11d. Therefore, the transmission antenna 11 and the reception antenna 12 can be installed in the relatively narrow space of the substrate surface. As a result, the area of the antenna 101 of the radar apparatus 10 is not increased, so that the radar apparatus 10 can be reduced in size. Since the antenna 11 provided with the transmission antenna 11 and the reception antenna 12 can be formed in the substantially rectangular shape, it is possible to downsize the radar apparatus 10 itself mounted with the antenna 101.

<2-2. Transmission Range>

Figure 4:
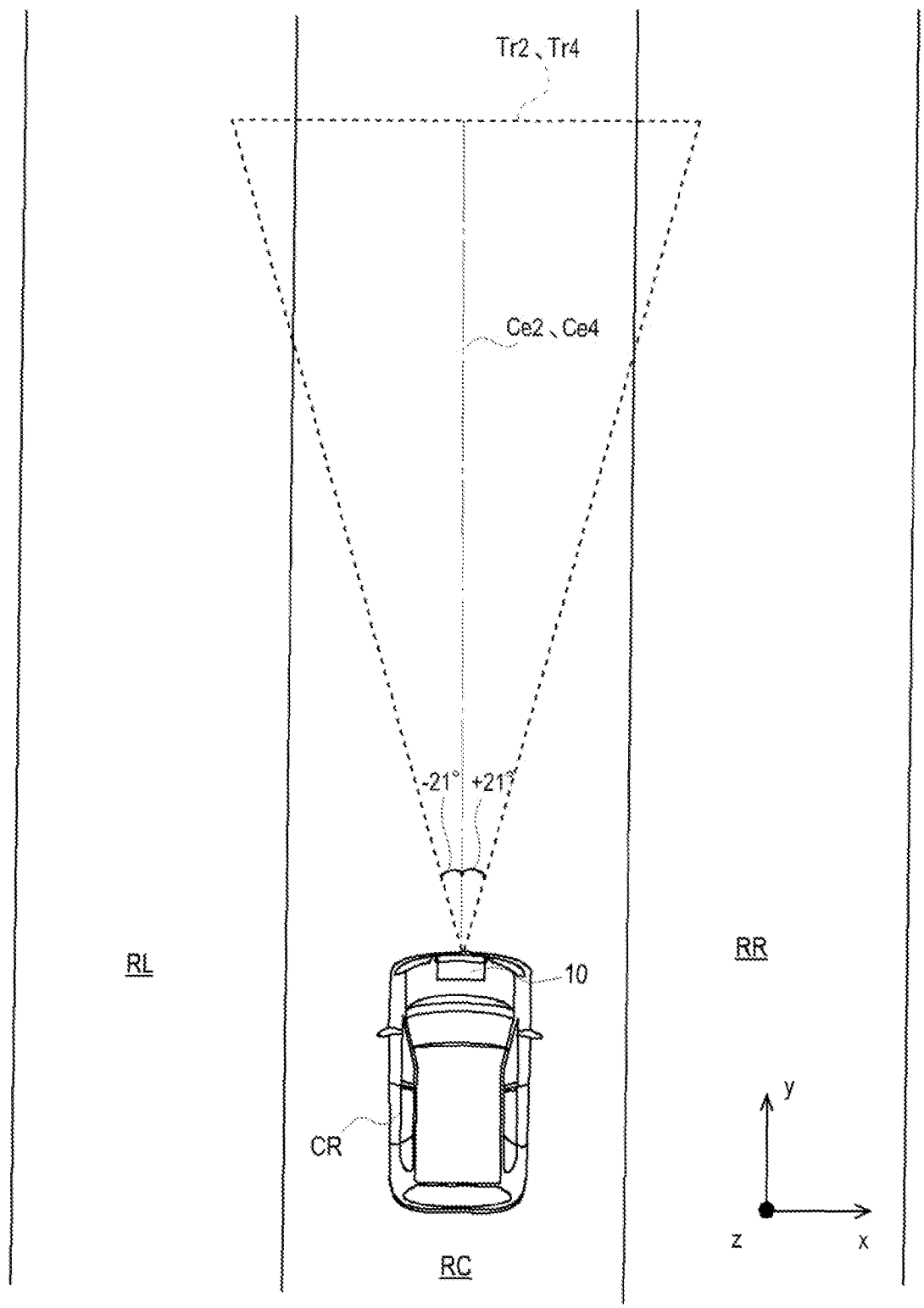
FIG. 4 is a diagram illustrating a transmission range of a transmission antenna in a horizontal direction to a road surface.
Figure 5:
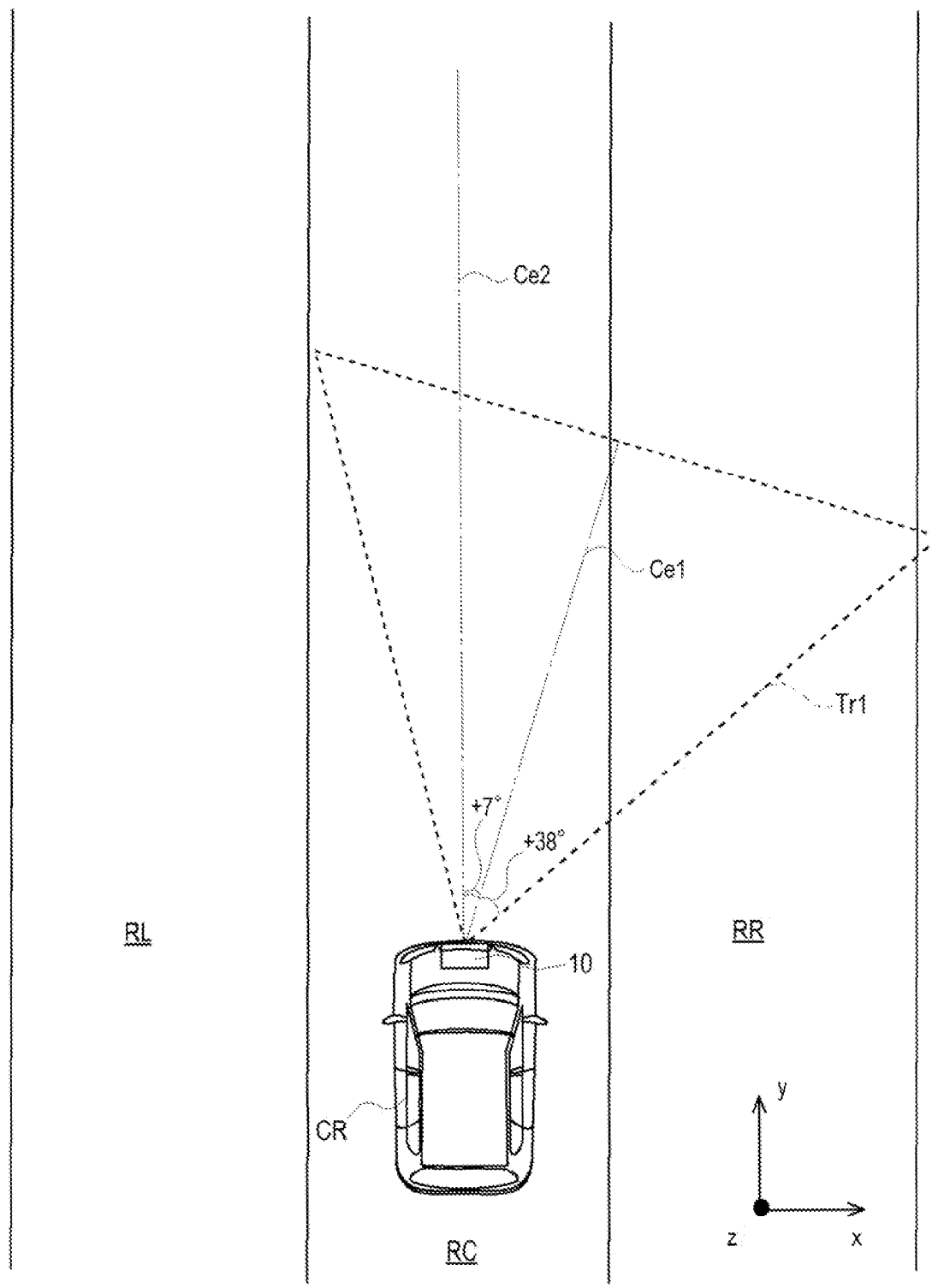
FIG. 5 is a diagram illustrating the transmission range of the transmission antenna in the horizontal direction to the road surface.
Figure 6:
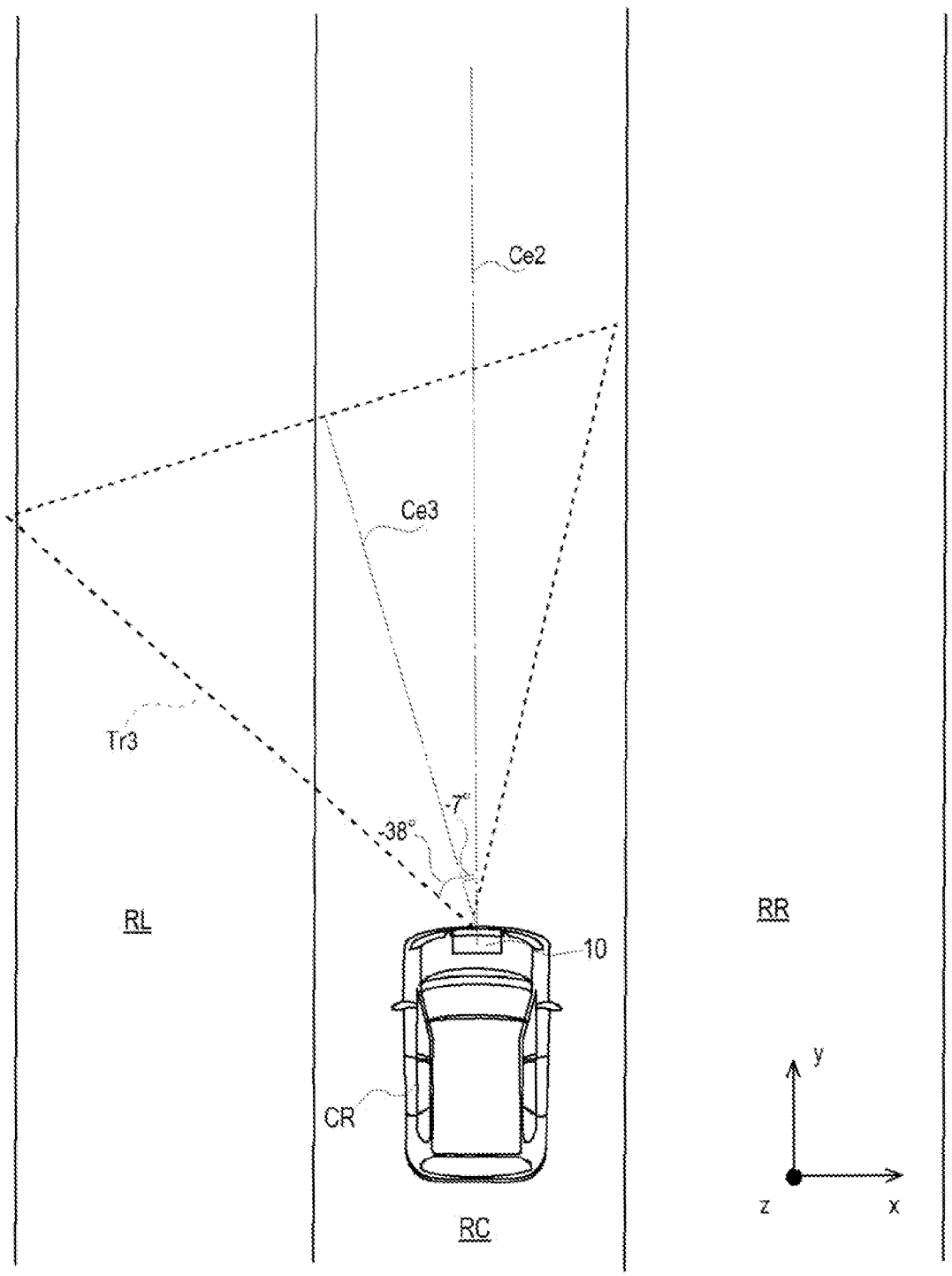
FIG. 6 is a diagram illustrating the transmission range of the transmission antenna in the horizontal direction to the road surface.
Figure 7:
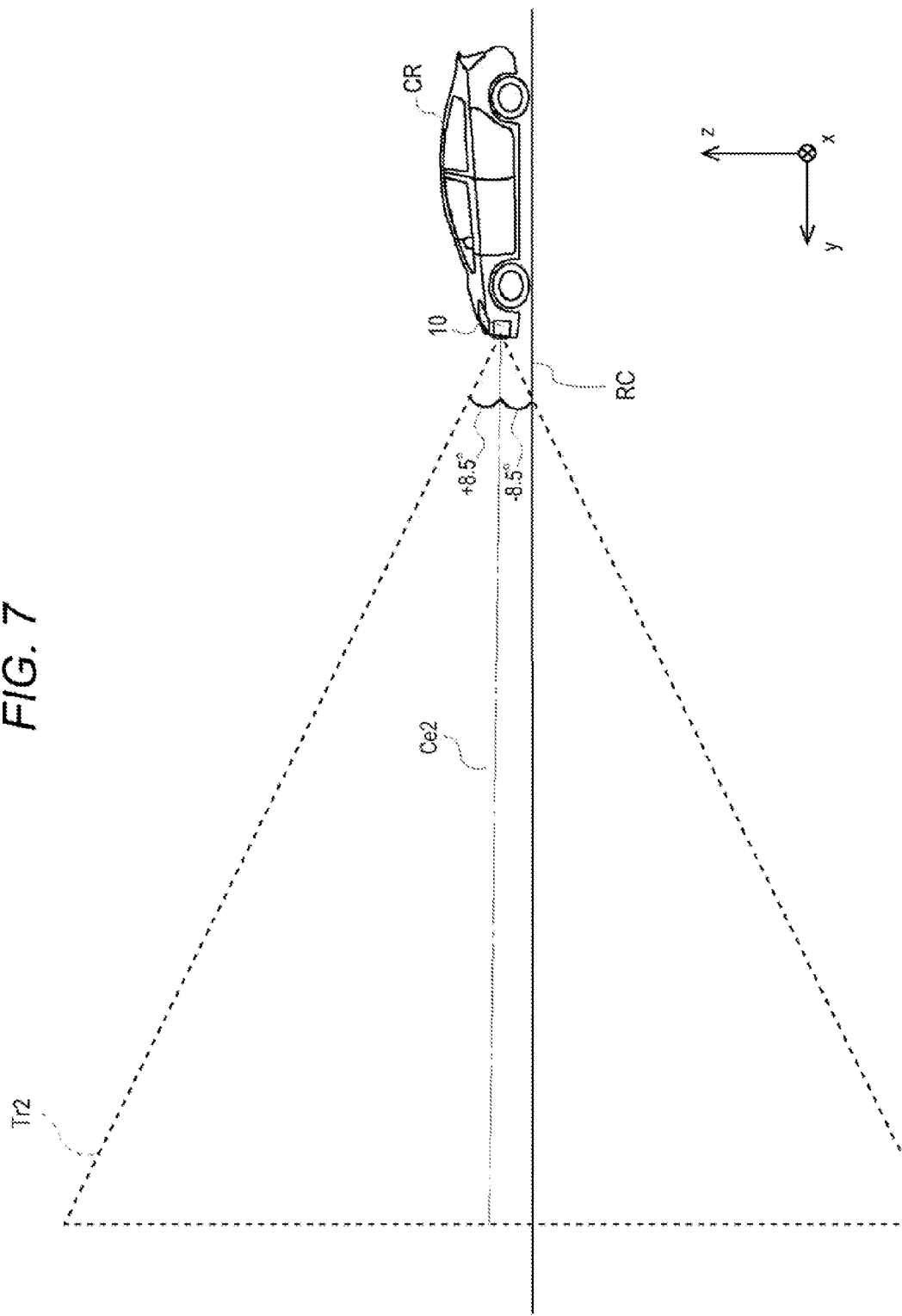
FIG. 7 is a diagram illustrating the transmission range of the transmission antenna in a vertical direction to the road surface.
Figure 8:
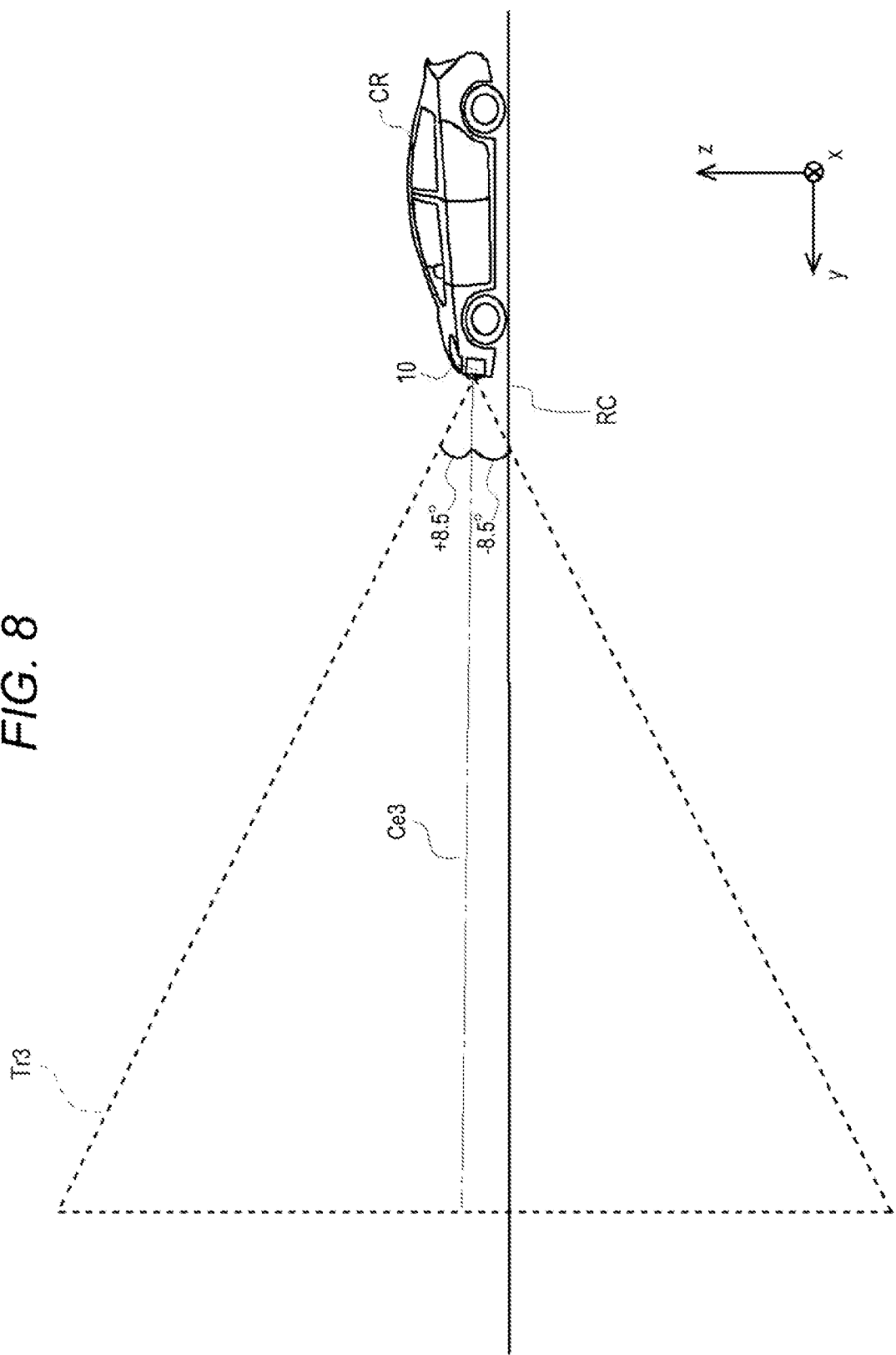
FIG. 8 is a diagram illustrating the transmission range of the transmission antenna in the vertical direction to the road surface.

Next, the transmission range of the respective transmission antennas 11a to 11d of the transmission antenna 11 will be described with reference to FIGS. 4 to 8. FIGS. 4 to 8 explain the direction by use of xyz coordinate axis. The xyz coordinate axis is relatively fixed to the vehicle CR. The vehicle width direction of the vehicle CR corresponds to the x-axis direction. The traveling direction of the vehicle CR corresponds to the y-axis direction. The height direction (vehicle height direction) of the vehicle CR corresponds to the z-axis direction. In this instance, FIGS. 4 to 6 are views seen from the upper side (+z side) to the lower side (−z side) in the height direction of the vehicle CR. FIGS. 7 and 8 are views seen from the left side (−x side) to the right side (+x side) in the vehicle width direction (x-axis direction) of the vehicle CR.

FIG. 4 is a diagram illustrating the transmission range of the transmission antennas 11b and 11d in the horizontal direction to the road surface (hereinafter referred to as a road surface) of the self-lane RC. FIG. 4 shows a transmission range Tr2 in front (+y side) of the vehicle CR traveling on the self-lane RC. The transmission range Tr2 is a range of the transmission wave outputted from the transmission antenna 11b. A width of the self-lane RC is about 3.6 m. A traffic lane RR (hereinafter referred to as a right lane RR) adjacent to the self-lane RC exists on the right side of the self-lane RC. A traffic lane RL (hereinafter referred to as a left lane RL) adjacent to the self-lane RC exists on the left side of the self-lane RC.

A second reference axis Ce2 is an axis extending to the traveling direction (+y side) of the vehicle CR, and is positioned at the substantially center of the transmission range Tr2. If the angle of the horizontal direction of the second reference axis Ce2 with respect to the road surface is ±0°, the transmission range Tr2 has a range with an angle of the horizontal direction, about +21°, in the right side (+x side) of the vehicle width direction (x-axis direction) of the vehicle CR, and an angle of the horizontal direction, about −21°, in the left side (−x side). Hereinafter, the angle of the vehicle width direction (x-axis direction) of the vehicle CR, with the angle of the respective reference axes being ±0°, is referred to as a horizontal angle. The horizontal angle is also referred to as an angle of the horizontal direction with respect to the road surface. In this instance, the length of the second reference axis Ce2 is about 150 m. That is, the transmission range Tr2 becomes a range within the horizontal angle of about ±21° in the vertical distance of about 150 m. The range within the horizontal angle of about ±21° is a range including a width (about 3.6 m) of the self-lane RC, if the vehicle CR is positioned at the substantially center of the self-lane RC. The transmission antenna 11b outputs the transmission wave within the transmission range Tr2 . As a result, the reception antenna 12 receives the reflection wave from the target existing within the transmission range Tr2.

The transmission range Tr4 is a range of the transmission wave outputted from the transmission antenna 11d. The fourth reference axis Ce4 is positioned at the substantially center of the transmission range (transmission range Tr4 ), similar to the second reference axis Ce2 . If the horizontal angle of the fourth reference axis Ce4 is ±0°, the transmission range Tr4 has a range with a horizontal angle of about +21° in the right side (+x side) of the vehicle width direction (x-axis direction) of the vehicle CR, and a horizontal angle of about −21° in the left side (−x side). In this instance, the length of the fourth reference axis Ce4 is about 150 m. That is, the transmission range Tr4 becomes a range within the horizontal angle of about ±21° in the vertical distance of about 150 m. The range within the horizontal angle of about ±21° is a range including a width (about 3.6 m) of the self-lane RC, if the vehicle CR is positioned at the substantially center of the self-lane RC. The transmission antenna 11d outputs the transmission wave within the transmission range Tr4. As a result, the reception antenna 12 receives the reflection wave from the target existing within the transmission range Tr4.

FIG. 5 is a diagram illustrating the transmission range of the transmission antenna 11a in the horizontal direction to the road surface. FIG. 5 shows a transmission range Tr1 in right front (+y side and +x side) of the vehicle CR traveling on the self-lane RC. The transmission range Tr1 is a range of the transmission wave outputted from the transmission antenna 11a. A first reference axis Ce1 is an axis obliquely extending to the right side (+x side) of the vehicle width direction (x-axis direction) with respect to the traveling direction (+y side) of the vehicle CR, and is positioned at the substantially center of the transmission range Tr1. If the horizontal angle of the second reference axis Ce2 is ±0°, the first reference axis Ce1 is positioned at the horizontal angle of about +7°. Further, if the horizontal angle of the first reference axis Ce1 is ±0°, the right end of the transmission range Tr1 is positioned at the horizontal angle of about +38°. In other words, if the horizontal angle of the second reference axis Ce2 is ±0), the right end of the transmission range Tr1 is positioned at the horizontal angle of about +45°.

If the horizontal angle of the first reference axis Ce1 is ±0°, the left end of the transmission range Tr1 is positioned at the horizontal angle of about −38°. In this instance, the length of the first reference axis Ce1 is about 80 m. That is, the transmission range Tr1 becomes a range within the horizontal angle of about ±38° in the case where the vertical distance is within about 150 m and the horizontal angle of the first reference axis Ce1 is ±00. The range within the horizontal angle of about ±380 is a range including a width (about 3.6 m) of the self-lane RC and the right lane RR (about 3.6 m), in the case where the vehicle CR is positioned at the substantially center of the self-lane RC. In other words, the range within the horizontal angle of about ±38° corresponds to the horizontal distance about −1.8 m to +5.4 m in the case where the vehicle CR is positioned at the substantially center of the self-lane RC. The transmission antenna 11a outputs the transmission wave within the transmission range Tr1. As a result, the reception antenna 12 receives the reflection wave from the target existing within the transmission range Tr1.

FIG. 6 is a diagram illustrating the transmission range of the transmission antenna 11c in the horizontal direction to the road surface. FIG. 6 shows a transmission range Tr3 in left front (+y side and −x side) of the vehicle CR traveling on the self-lane RC. The transmission range Tr3 is a range of the transmission wave outputted from the transmission antenna 11c. A third reference axis Ce3 is an axis obliquely extending to the left side (−x side) of the vehicle width direction (x-axis direction) with respect to the traveling direction (+y side) of the vehicle CR, and is positioned at the substantially center of the transmission range Tr3 . If the horizontal angle of the second reference axis Ce2 is ±0°, the third reference axis Ce3 is positioned at the horizontal angle of about −7°. Further, if the horizontal angle of the third reference axis Ce3 is ±0°, the left end of the transmission range Tr3 is positioned at the horizontal angle of about −38°. In other words, if the horizontal angle of the second reference axis Ce2 is ±0°, the left end of the transmission range Tr3 is positioned at the horizontal angle of about −45°.

If the horizontal angle of the third reference axis Ce3 is ±0°, the right end of the transmission range Tr3 is positioned at the horizontal angle of about +38°. In this instance, the length of the third reference axis Ce3 is about 80 m. That is, the transmission range Tr3 becomes a range within the horizontal angle of about ±38° in the case where the vertical distance is within about 80 m and the horizontal angle of the third reference axis Ce3 is ±0°. The range within the horizontal angle of about ±38° is a range including a width (about 3.6 m) of the self-lane RC and the left lane LR (about 3.6 m), in the case where the vehicle CR is positioned at the substantially center of the self-lane RC. In other words, the range within the horizontal angle of about ±38° corresponds to the horizontal distance about −5.4 m to about +1.8 m in the case where the vehicle CR is positioned at the substantially center of the self-lane RC. The transmission antenna 11c outputs the transmission wave within the transmission range Tr3. As a result, the reception antenna 12 receives the reflection wave from the target existing within the transmission range Tr3.

From the above description, when the transmission ranges Tr2 and Tr4 are compared with the transmission ranges Tr1 and Tr3, the output distance of the transmission wave is extended, and the horizontal angle has the narrow range. In other words, when the transmission ranges Tr1 and Tr3 are compared with the transmission ranges Tr2 and Tr4, the output distance of the transmission wave is shortened, and the horizontal angle has the wide range.

The vehicle control device 20 performs the control necessary for the vehicle CR based on the target information derived from the whole transmission range of the transmission ranges Tr1 to Tr4. The vehicle control device 20 performs the ACC control on the vehicle CR follow-up traveling the other vehicle. For example, the other vehicle is a target traveling in the same direction as the vehicle CR in the traffic lane on which the vehicle CR travels, and existing relatively far (e.g., 100 m) away from the vehicle CR. The other vehicle exists in any one range of the transmission ranges Tr1 to Tr4. Further, the vehicle control device 20 performs the PCS control on the vehicle CR to prevent the vehicle CR from colliding against the other vehicle. The other vehicle is a target approaching the vehicle CR at a given speed (e.g., 60 km/h) or more, and existing at the position near the vehicle CR. The other vehicle exists in any one range of the transmission ranges Tr1 to Tr4. In this way, the radar apparatus 10 can output the transmission wave to derive the target information necessary for at least one vehicle control among plural types of vehicle controls by the vehicle control device 20, using the configuration of the transmission antenna 11 and the reception antenna 12 of the antenna 101 described in FIG. 3. Therefore, the vehicle control device 20 can perform an appropriate vehicle control based on the target information among plural types of vehicle controls.

FIG. 7 is a diagram illustrating the transmission ranges Tr2 and Tr4 of the transmission antennas 11b and 11d in the direction perpendicular to the road surface. Hereinafter, although the vertical transmission ranges of the transmission ranges tr2 and Tr4 will be described, since two transmission ranges are substantially identical to each other, the transmission range tr2 will be described as an example. FIG. 7 shows the transmission range Tr2 in front (+y side) of the vehicle CR traveling on the self-lane RC. If the angle of the vertical direction of the second reference axis Ce2 with respect to the road surface is ±0, the transmission range Tr2 has an range with the angle of the vertical direction, about +8.5, in the upper side (+z side) of the height direction of the vehicle CR, and an angle of the vertical direction, about −8.5°, in the lower side (−z side). Hereinafter, the angle of each reference axis is set to ±0°, and the angle of the height direction (z-axis direction) of the vehicle CR is referred to as the vertical angle. The vertical angle is also called as an angle of the vertical direction to the road surface. In this instance, the second reference axis Ce2 is substantially parallel with the road surface, and has a length of about 150 m. That is, the transmission range Tr2 becomes a range within the vertical angle of about +8.5° in the vertical distance of about 150 m. The transmission antenna 11b outputs the transmission wave within the transmission range Tr2 . As a result, the reception antenna 12 receives the reflection wave from the target existing within the transmission range Tr2.

FIG. 8 is a diagram illustrating the transmission range Tr3 of the transmission antenna 11c in the direction perpendicular to the road surface. FIG. 8 shows the transmission range Tr3 in front (+y side) of the vehicle CR traveling on the self-lane RC. If the vertical angle of the third reference axis Ce3 is ±0°, the transmission range Tr2 has an range with the vertical angle of about +8.5°, in the upper side (+z side) of the height direction of the vehicle CR, and a vertical angle of about −8.5° in the lower side (−z side). In this instance, the third reference axis Ce3 is substantially parallel with the mad surface, and has a length of about 80 m. That is, the transmission range Tr3 becomes a range within the vertical angle of about ±8.5° in the vertical distance of about 80 m. The transmission antenna 11c outputs the transmission wave within the transmission range Tr3. As a result, the reception antenna 12 receives the reflection wave from the target existing within the transmission range Tr3.

From the above description, when the transmission ranges Tr2 and Tr4 are compared with the transmission range Tr3, the vertical distance is extended, and the vertical angle has the substantially same range. In other words, when the transmission range Tr3 is compared with the transmission ranges Tr2 and Tr4, the vertical distance is shortened, and the vertical angle has the substantially same range.

Returning back to FIG. 2, the mixer 13 has four mixers 13a to 13d. The mixer 13 is provided to each of the reception antennas 12a to 12d, and mixes the receiving signal corresponding to the reflection wave received by the reception antenna 12 and the transmitting signal corresponding to the transmission wave. The mixer 13 generates a beat signal which is a difference between the receiving signal and the receiving signal, to output it to the AD converter 14.

The AD converter 14 has four AC converters 14a to 14d. The AD converter 14 is provided to the respective reception antennas 12a to 12d. The AD converter 14 converts an analog signal inputted from the mixer 13 into a digital signal. Specifically, the AD converter 14 samples beat signals of the analog signal in a given period. The AD converter 14 quantizes the beat signal which has been sampled, and converts it into a digital signal. The AD converter 14 outputs the digital signal to the signal processing unit 18.

The signal processing unit 15 generates a triangular signal for modulation to output it to the oscillator 16. The oscillator 16 modulates the triangular signal into a signal of millimeter-wave band (e.g., 76.5 GHz) to output it to the switch 17.

The switch 17 is connected to the respective transmission antennas 11a to 11d. The switch 17 switches the transmission antenna to be connected in each given timing (e.g., 5 msec). The switch 17 outputs the transmission signal which is a signal of millimeter-wave band to any one of the transmission antennas 11a to 11d.

<2-3. Output Timing of Transmission Wave>

Figure 9:
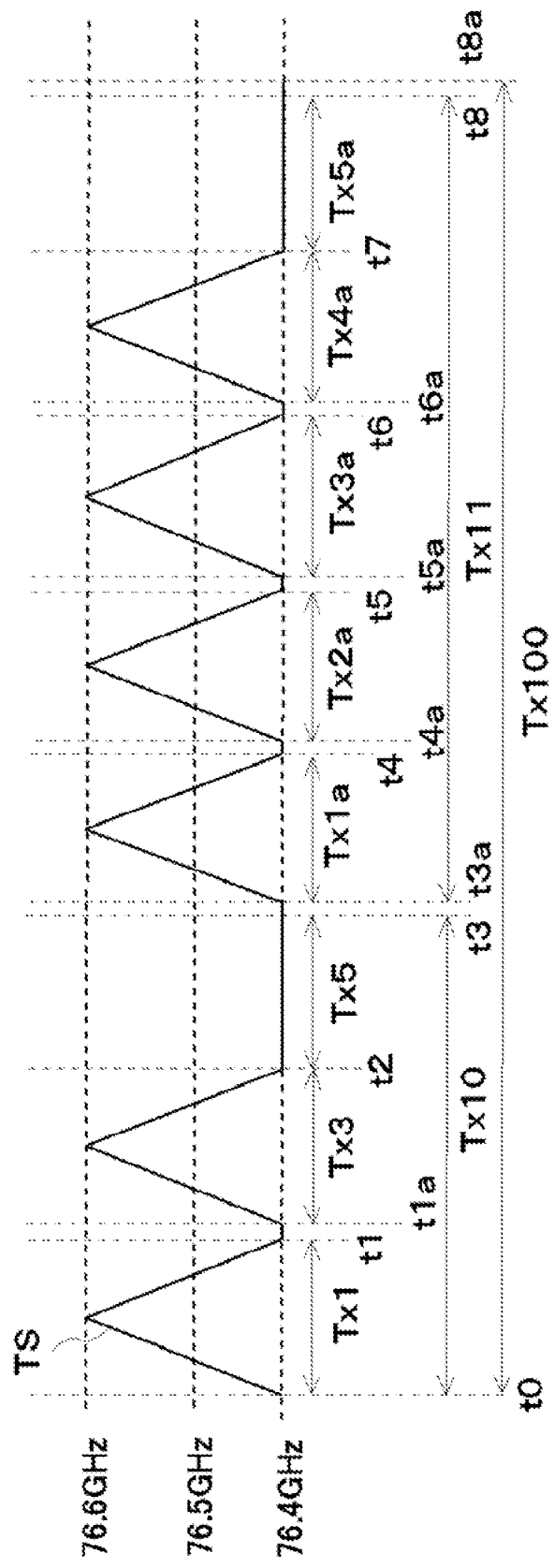
FIG. 9 is a diagram explaining an output timing of the transmission wave of each transmission antenna.

The output timing of the transmission wave from the transmission antennas 11a to 11d will now be described with reference to FIG. 9. FIG. 9 is a graph explaining the output timing of the transmission wave from the respective transmission antennas 11a to 11d. In FIG. 9, a vertical axis represents a frequency (GHz), and a horizontal axis represents a time (msec). In the drawing, the transmitting signal TS is a signal repeating a constant change between 200 MHz, for example, it ascends up to a first predetermined frequency (e.g., 76.6 GHz) and then descends to a second predetermined frequency (e.g., 76.4 GHz), with a center frequency being 76.5 GHz.

The transmission period Tx1 of the transmission signal TS is a period in which the transmission wave is outputted from the transmission antenna 11a. In other words, the transmission antenna 11a outputs the transmission wave during the first transmission period Tx1 between time T0 to time t1. The switch 17 switches the antenna for outputting the transmission wave from the transmission antenna 11a to the transmission antenna 11c for time t1 to time t1a.

The third transmission period Tx3 is a period in which the transmission wave is outputted from the transmission antenna 11c. In other words, the transmission antenna 11c outputs the transmission wave during the third transmission period Tx3 between time t1a and time 12.

The first processing period Tx5 is a period in which the signal processing unit 18 derives the position of the target in the horizontal direction to the road surface, based on the reflection wave from the target.

The period including the first transmission period Tx1 , the third transmission period Tx3 , and the first processing period Tx5 becomes the first period Tx10. The first period Tx10 is a period of time t0 to time t3. During the first period Tx10, the transmission wave is outputted from the transmission antenna 11a and the transmission antenna 11c in order. Further, during the first period Tx10, the signal processing unit 18 derives the position of the target in the horizontal direction to the road surface, based on the reflection wave of the transmission wave from the target.

The switch 17 switches the antenna outputting the transmission wave from the transmission antenna 11c to the transmission antenna 11a between time t3 and time 3a.

The first transmission period Tx1 a is a period in which the transmission wave is outputted from the transmission antenna 11a. In other words, the transmission antenna 11a outputs the transmission wave during the first transmission period Tx1 a between time t3 a and time t4. The switch 17 switches the antenna outputting the transmission wave from the transmission antenna 11a to the transmission antenna 11b between time t4 and time t4a.

The second transmission period Tx2a is a period in which the transmission wave is outputted from the transmission antenna 11b. In other words, the transmission antenna 11b outputs the transmission wave during the second transmission period Tx2a between time t4a and time t5. The switch 17 switches the antenna outputting the transmission wave from the transmission antenna 11b to the transmission antenna 11c between time t5 and time t5a.

The third transmission period Tx3a s a period in which the transmission wave is outputted from the transmission antenna 11c. In other words, the transmission antenna 11c outputs the transmission wave during the third transmission period Tx3a between time t5a and time t16. The switch 17 switches the antenna outputting the transmission wave from the transmission antenna 11c to the transmission antenna 11d between time t6 and time t6a.

The fourth transmission period Tx4a is a period in which the transmission wave is outputted from the transmission antenna 11d. In other words, the transmission antenna 11d outputs the transmission wave during the fourth transmission period Tx4a between time t6a and time t7.

The second processing period Tx5a is a period in which the signal processing unit 18 derives the position of the target in the horizontal direction and the height of the target in the vertical direction with respect to the road surface, based on the reflection wave from the target.

The period including the first transmission period Tx1a, the second transmission period Tx2a, the third transmission period Tx3a, the fourth transmission period Tx4a, and the second processing period Tx5a becomes the second period Tx11. The second period Tx11 is a period of time t3a to time t8 During the second period Tx11, the transmission wave is outputted from the transmission antennas 11a to 11d in order. Further, during the second period Tx11, the signal processing unit 18 derives the position of the target in the horizontal direction and the height of the target in the vertical direction with respect to the road surface, based on the reflection wave of the transmission wave from the target.

That is, the position of the horizontal direction is derived based on the receiving signal during the first transmission period Tx1a and the third transmission period Tx3a, and the height of the vertical direction is derived based on the receiving signal during the second transmission period Tx2a, the third period Tx3a, the third transmission period Tx3a, and the fourth transmission period Tx4a. Both processes of deriving the position of the target in the horizontal direction and the height of the target in the vertical direction with respect to the road surface employ the plurality of transmission antennas, for example, transmission antennas 11b, 11c and 11d, thereby decreasing the number of transmission antennas 11. As a result, the radar apparatus 10 can derive the position of the target in the horizontal direction and the height of the target in the vertical direction with respect to the road surface by the relatively compact antenna 101.

The switch 17 switches the antenna outputting the transmission wave from the transmission antenna 11c to the transmission antenna 11a between time t8 and time t8 a.

In this instance, the cycle period Tx100 including the first period Tx10 and the second period Tx11 becomes one cycle of the target deriving process. In other words, the next cycle of the target deriving process starts from time t8a. In the next cycle, similar to the previous cycle, the transmission wave is outputted from the transmission antennas 11a and 11c in order during the first period, and then the target deriving process is performed. The transmission wave is outputted from the transmission antennas 11a to 11c in order during the second period, and then the target deriving process is performed. In this instance, the time of the cycle period Tx100 is 110 msec, for example. The time of the first period Tx10 is, for example, 50 msec, and the time of the second period Tx11 is, for example, 60 msec. Further, the output time of the transmission wave from one transmission antenna of the transmission antenna 11 is 5 msec, for example.

Further, as described above, the transmission wave is outputted from the four transmission antennas 11a to 11d during the second period Tx11 of one cycle to derive the position of the target in the horizontal direction and the height of the target in the vertical direction. However, the why the transmission wave is outputted from the two transmission antennas 11a and 11c during the first period Tx10 of one cycle to derive only the position of the target in the horizontal direction is as follows. That is, the reason is that since internal circuits of the radar apparatus 10 generates heat due to the output of the transmission wave, it prevents the damage of the radar apparatus 10.

For the position of the target in the horizontal position, a relatively high frequency of derivation is needed to cope with the other vehicle which abruptly cuts in front of the vehicle CR. However, since the substance above the road, such as a road traffic sign, does not abruptly cut in the vehicle CR, a frequency of derivation may be relatively low for the height of the target in the vertical direction. Therefore, since the heat generation of the radar apparatus 10 is prevented, it is possible to a bad influence from being exerted on the target deriving process. Further, the radar apparatus 10 can derive at least position of the target at the horizontal angle twice during one cycle, and can derive the height of the target in the vertical direction once. That is, the radar apparatus 10 can derive early the change in position of the target in the horizontal direction, relative to the change in height of the target in the vertical direction. As a result, the vehicle control device 20 receiving the target information from the radar apparatus 10 can appropriately control the target required for the vehicle control in at least one control of the ACC control and the PCS control.

<2-4. Derivation of Beat Signal>

Figure 10:
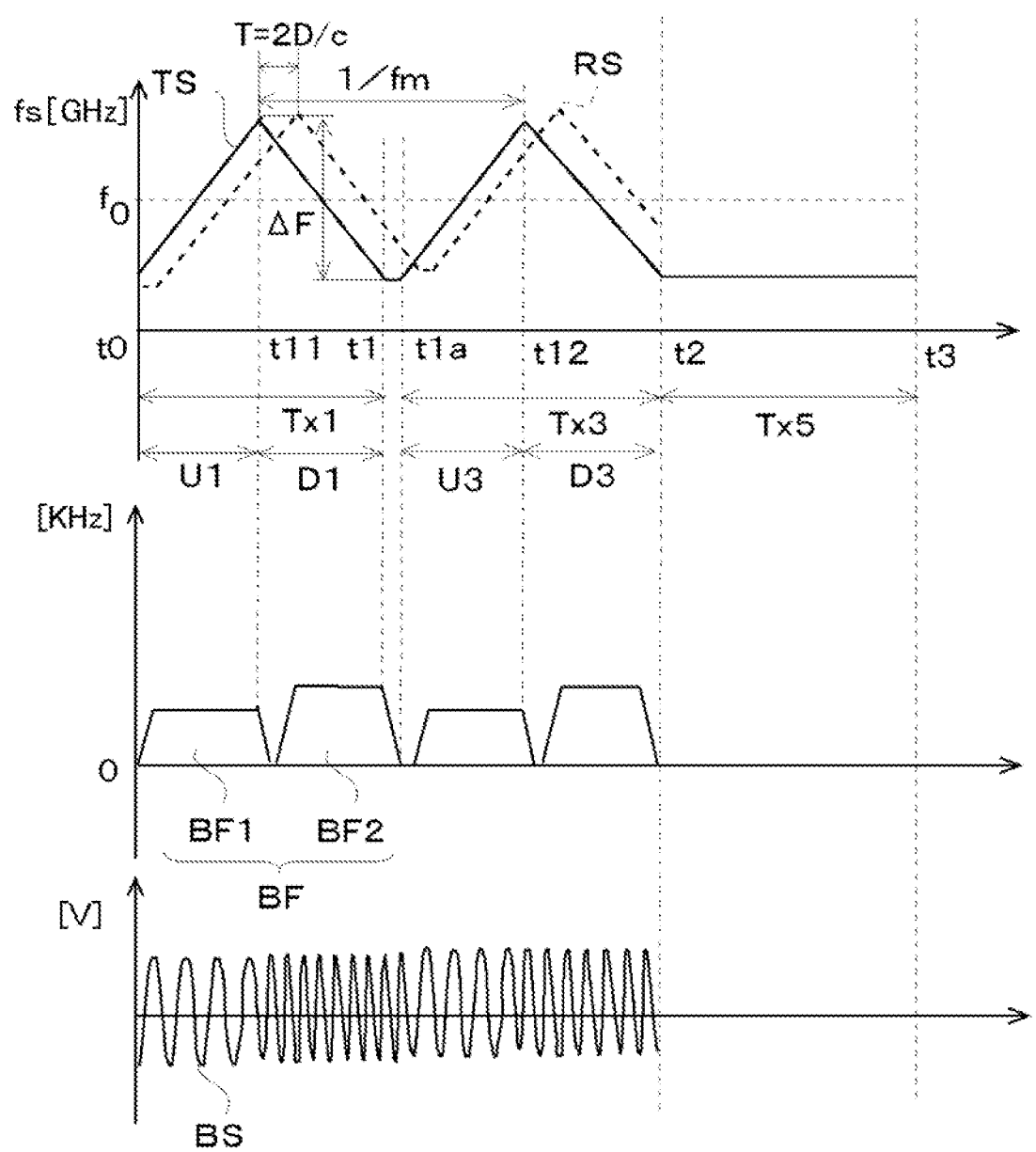
FIG. 10 is a diagram explaining derivation of a beat signal based on a transmitting signal and a receiving signal.

Description will be made of the derivation of the beat signal BS based on the transmitting signal TS and the receiving signal RS, which is described below, for example, during the first period Tx10. FIG. 10 is a diagram explaining the derivation of the beat signal based on the transmitting signal TS and the receiving signal RS.

Each symbol in FIG. 10 and each symbol in expressions described below are as follows: fr is distance frequency, fd is speed frequency, Fo is center frequency of a transmission wave, DF is frequency deviation width, fm is repetition frequency of a modulation wave, c is speed of light (speed of a wave), T is reciprocating time of a wave between the vehicle CR and the target, fs is transmission/reception frequency, R is vertical distance, and V is relative speed.

The upper drawing in FIG. 10 is a diagram illustrating a signal waveform of the transmitting signal TS and the receiving signal RS. The middle drawing in FIG. 10 is a diagram illustrating a beat frequency BF generated by a difference frequency between the transmitting signal TS and the receiving signal RS. The lower drawing in FIG. 10 is a diagram illustrating the beat signal BS corresponding to the beat frequency BF.

In the upper drawing in FIG. 10, a vertical axis represents a frequency (GHz), and a horizontal axis represents a time (msec). In the drawing, the transmitting signal TS repeats a constant change between 200 MHz, for example, it ascends up to a predetermined frequency (e.g., 76.6 GHz) and then descends to a predetermined frequency (e.g., 76.4 GHz), with a center frequency being 76.5 GHz.

The transmitting signal TS has a period (hereinafter referred to as an up period) in which the frequency ascends up to a predetermined frequency. The up period corresponds to a period U1 (time t0 to time t11) and a period U3 (time t1a to time t12). The transmitting signal TS has a period (hereinafter referred to as a down period) in which the frequency descends to a predetermined frequency after it ascends to the predetermined frequency. The down period corresponds to a period D1 (time t11 to time t1) and a period D3 (time t12 to time t2). The first transmission period Tx1 has the period U1 and the period D1. The third transmission period Tx3 has the period U3 and the period D3.

In the first transmission period Tx1, the transmission wave is outputted from the transmission antenna 11a. The transmission wave is received by the reception antenna 12 as the reflection wave from the target. As a result, the receiving signal RS is outputted to the mixer 13 through the reception antenna 12. In this instance, similar to the transmitting signal TS, the receiving signal RS has an up period in which the frequency ascends up to a predetermined frequency, and a down period in which the frequency descends to a predetermined frequency. Further, in the third transmission period Tx3, the transmission wave is outputted from the transmission antenna 11c, and the receiving signal RS based on the reflection wave is outputted to the mixer 13 through the reception antenna 12.

In this instance, the receiving signal RS has a time delay in comparison to the transmitting signal TS depending on the vertical distance of the target with respect to the vehicle CR. Further, if there is a speed difference between the speed of the vehicle CR and the speed of the target, a difference occurs in the receiving signal RS by Doppler shift relative to the transmitting signal.

In the middle drawing in FIG. 10, a vertical axis represents a frequency (GHz), and a horizontal axis represents a time (msec). The drawing shows the beat signal representing the difference between the transmitting signal and the receiving signal in the up period and the down period. For example, a beat frequency BF1 is derived in the period U1, and a beat frequency BF2 is derived in the period D1. In this way, the beat frequency BF is derived in each period.

In the lower drawing in FIG. 10, a vertical axis represents amplitude (V), and a horizontal axis represents a time (msec). The drawing shows the beat signal BS of an analog signal corresponding to the beat frequency BF. The beat signal BS is converted from the analog signal into the digital signal by the AD converter 14.

In FIG. 10, the beat signal BS is shown in the case where the reception antenna 12 receives the reflection wave from one reflection point of the target. By contrast, in the case where the reception antenna 12 receives plural reflection waves from the plurality of reflection points of the target, the beat signal BS according to plural reflection wave is derived.

Returning to FIG. 2, the signal processing unit 18 includes a Fourier transforming part 18a, a peak extracting part 18b, a horizontal angle deriving part 18c, a vertical distance/relative speed deriving part 18d, and a vertical angle deriving part 18e.

The Fourier transforming part 18a analyzes the frequency of the digital signal which is converted by the AD converter, by use of a DSP (Digital Signal Processor) circuit (not illustrated). Specifically, the Fourier transforming part 18a generates FFT data of which the digital signal is decomposed for each frequency by FFT (Fast Fourier Transform).

The peak extracting part 18b extracts a signal among the signal for each frequency in the FFT data, of which a signal level exceeds a given threshold value, as a peak signal.

The horizontal angle deriving part 18c derives the angle of the target in the horizontal direction to the road surface by use of a certain angle estimation method. Specifically, the horizontal angle deriving part 18c derives the angle of the target in the horizontal direction to the road surface, from the peak signal based on the receiving signal received by the reception antennas 12a to 12d. The horizontal angle deriving part 18c outputs the angle of the target in the horizontal direction to the road surface to the vertical distance/relative speed deriving part 18d.

<2-5 Derivation of Horizontal Angle>

Figure 11:
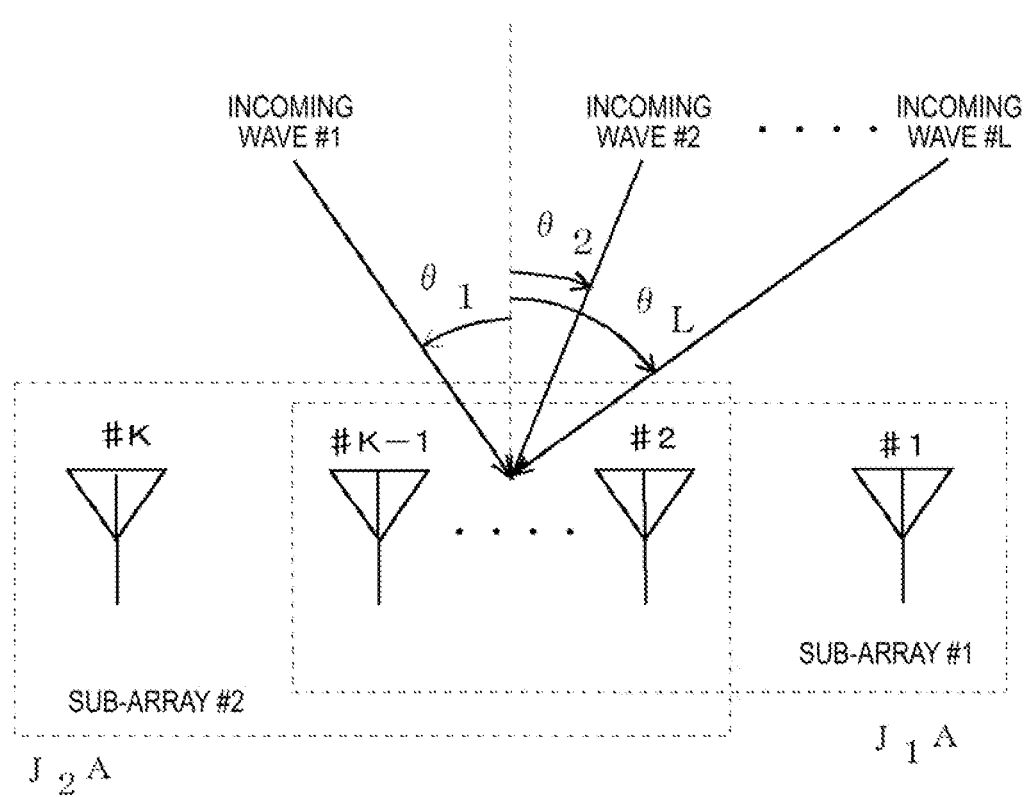
FIG. 11 is a diagram explaining a process outline of ESPRIT.

The case where the horizontal angle deriving part 18c employs ESPRIT as an example of the angle estimation method will be described with reference to FIG. 11. In the case where the radar apparatus 10 employs the ESPRIT as the angle estimation method, it is possible to derive each horizontal angle of three targets positioned at the substantially same vertical distance by the four reception antennas. That is, the radar apparatus 10 can derive the horizontal angle of the same number of the targets as the number obtained by subtracting 1 from the total number of the antennas 12, among plural targets positioned at the substantially same vertical distance. FIG. 11 is a diagram explaining a process outline of the ESPRIT.

The ESPRIT is a technique of dividing the reception antennas 12a to 12d by two positional-deviated sub-arrays and estimating an incoming direction of an incoming wave (reflection wave) from the phase difference of two sub-arrays.

As illustrated in FIG. 11, there is a linear array composed of K elements. The number of incoming waves is set to L, and an angle of the ith incoming wave is set $\theta i$ (i=1, 2, ..., K).

The ESPRIT is a technique of estimating phase rotation of each incoming wave generated by parallel translation of the whole arrays, on the basis of rotational invariance "$J_1 A\Phi = J_2 A$". The matrix $J_1$ and the matrix $J_2$ are transformation matrix of (K−1)×K. K is the number of the reception antennas 12. A is a direction matrix composed of array response vectors with variables of $\theta_1$ to $\theta_L$. $\Phi$ is a diagonal matrix of an L term.

As illustrated in FIG. 11, in the linear array composed of K elements, the (K−1)th element from the first element becomes a sub-array #1, and the Kth element from the second element becomes a sub-array #2. In this way, $J_1 A$ of the rotational invariance means that 1st to (K−1)th column of the matrix A is extracted, and $J_2 A$ of the rotational invariance means that 2nd to Kth column A is extracted. That is, $J_1 A$ represents the direction matrix of the sub-array #1. $J_1 A$ represents the direction matrix of the sub-array #2.

If A is known, $\Phi$ is found to estimate the incoming angle of a path. However, since A should be estimated, it is not possible to directly find a solution to $\Phi$. Accordingly, K×K covariance matrix Rxx of K-dimensional receiving signal vector is found. Rxx is subjected to eigenvalue expansion, and a signal subspace matrix Es is generated from the eigenvalue obtained therefrom by use of an eigenvector corresponding to an eigenvalue higher than thermal noise power $\sigma^2$.

The generated signal subspace matrix Es and the matrix A can be represented by $A = Es T^{-1}$ by use of a regular matrix T of an L term existing therebetween. Herein, Es is a K×L matrix. T is a regular matrix of L×L. If the rotational invariance is substituted by the equation of A=EsT⁻¹, (J₁Es) (TΦT⁻¹)=J₂Es is obtained. If the eigenvalue expansion is performed after TΦT⁻¹ is found from the equation, the eigenvalue becomes a diagonal element of Φ. As a result, the angle of the incoming wave is estimated from the eigenvalue.

Returning to FIG. 2, the vertical distance/relative speed deriving part 18d derives the vertical distance and the relative speed. Specifically, the vertical distance/relative speed deriving part 18d derives the paired data by pairing the peak signal of the up period and the peak signal of the down period. The vertical distance/relative speed deriving part 18d derives the vertical distance of the target corresponding to the paired data by use of Equation 1 below. Further, the vertical distance/relative speed deriving part 18d derives the relative speed of the target corresponding to the paired data by use of Equation 2 below. In this instance, the horizontal distance of the target corresponding to the paired data is derived by calculation using a trigonometric function from the information about the vertical distance and the horizontal angle derived by the horizontal angle deriving part 18c.

[Equation 1]
$$R = \frac{(f_{up} + f_{dn}) \cdot c}{2 \times (4 \times \Delta F \times f_m)} \quad (1)$$

[Equation 2]
$$V = \frac{(f_{up} - f_{dn}) \cdot c}{2 \times (4 \times \Delta F \times f_m)} \quad (2)$$

In this instance, the vertical distance/relative speed deriving part 18d derives the distance and the relative speed of the target from the receiving signal based on the transmission wave of each transmission antenna. For example, in the second period Tx11 described in FIG. 9, the Fourier transforming part 18a generates three FFT data for the four transmission antennas in the second processing period Tx5a. The reason why there are three FFT data for the four transmission antennas is that the transmission ranges (Tr2 and Tr4) of the transmission antennas 11b and 11d are substantially equal to each other. The Fourier transforming part 18a generates FFF data of 3×4=12 by the four transmission antennas and the four reception antennas. The peak signals of the FFT data of the four reception antennas for one transmission antenna show substantially same characteristics in signal level and frequency. For this reason, for example, the peak signals of the four FFT data are used by averaging the signal levels. Hereinafter, for the sake of simple explanation, the peak signals of the FFT data of the four reception antennas for one transmission antenna is used as average, and three FFT data for the four transmission antenna will be described.

The Fourier transforming part 18a generates FFT data of the first transmission period Tx1a of the transmission antenna 11a. Further, the Fourier transforming part 18a generates FFT data based on the second transmission period Tx2a of the transmission antenna 11b and the fourth transmission period Tx4a of the transmission antenna 11d. The FFT data of the second transmission period Tx2a and the fourth transmission period Tx4a is FFT data derived by averaging the beat signals corresponding to both periods. Further, the Fourier transforming part 18a generates FFT data of the third transmission period Tx3a of the transmission antenna 11c.

The peak extracting part 18b extracts the peak signals from the three FFT data. If the peak signals exist at the same frequency as the plurality of FFT data, the peak signal having the high signal level is targeted to extract the peak. As a result, the peak extracting part 18b can extract the peak signal corresponding to the target within the overall transmission ranges of the transmission ranges Tr1 to Tr4 corresponding to the transmission antennas 11a to 11d. For this reason, the vertical distance/relative speed deriving part 18d can derive the distance and the relative speed of the target existing within the overall transmission range of the transmission antennas 11a to 11d. Further, the horizontal angle deriving part 18c can derive the horizontal distance from the angle of the target existing within the overall transmission range of the transmission antennas 11a to 11d.

The vehicle control device 20 performs at least one control of the ACC control and the PCS control based on the target information derived by the above way. That is, by use of the respective transmission antennas 11a to 11d provided to one antenna 101, the radar apparatus 10 can perform the distant beam radiation at a relatively narrow angle, and radiate a close-range beam radiation in the relatively wide range. As a result, based on the target information derived at any one position within the overall transmission range of the respective transmission antennas 11a to 11d, the vehicle control apparatus 20 can perform any one of the ACC control and the PCS control on the vehicle CR.

The vertical angle deriving part 18e derives the height of the target in the direction perpendicular to the road surface. The vertical angle deriving part 18c derives the vertical angle of the target to the road surface. Specifically, the vertical angle deriving part 18e derives the vertical angle of the target to the road surface based on the reflection wave of which the transmission waves outputted from the transmission antennas 11b, 11c and 11d are reflected from the target. The vertical angle of the target to the road surface is derived by use of the angle estimation method of ESPRIT described above, based on the phase difference of the transmission antennas 11b, 11c and 11d in the direction perpendicular to the substrate surface. Further, the height of the target in the direction perpendicular to the road surface is derived by the calculation using the trigonometric function from the information about the vertical and the vertical distance.

<2-6. Derivation of Vertical Angle>

Figure 12:
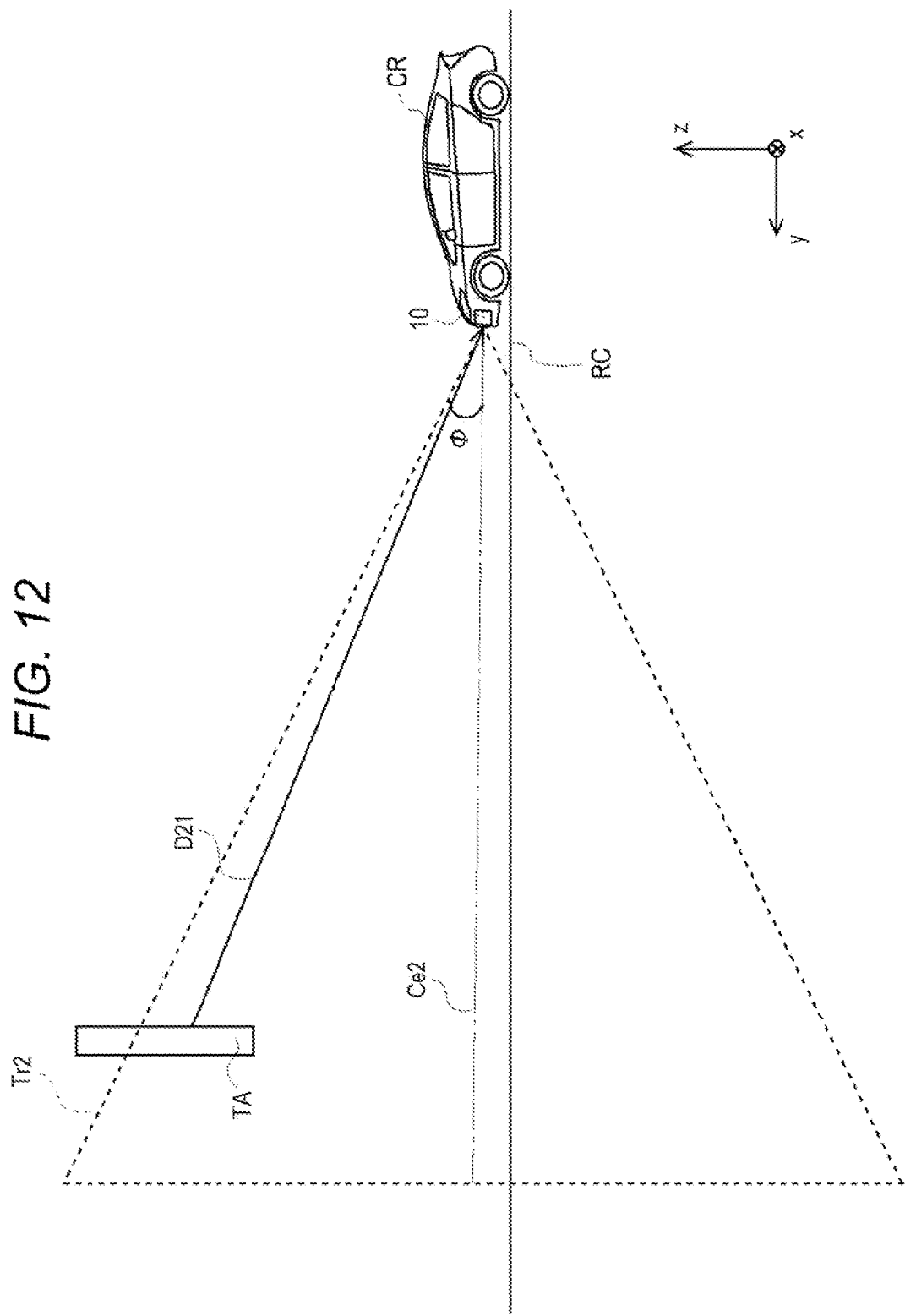
FIG. 12 is a diagram explaining a reflection wave from a target.

The derivation of the vertical angle will now be described in detail with reference to FIGS. 12 to 15. FIG. 12 is a diagram explaining the reflection wave from the target. FIG. 12 explains the direction by use of xyz coordinate axis, similar to FIG. 7 or the like. FIG. 12 shows the transmission range Tr2 of the transmission antenna 11b of the radar apparatus 10. The substance TA above the road exists at the upper side (+4 side) in the vertical direction (z-axis direction) to the road surface in front (+y direction) of the vehicle CR positioned on the road surface, within the transmission range Tr2. The substance TA above the road is, for example, a sign, such as a road traffic sign, and exists at a position of about 4.5 m in a case where the height of the road surface is 0 m. Further, the vertical distance of the substance TA above the road to the vehicle CR is about 70 m.

The reflection wave from the substance TA above the road is a reflection wave D21 directly received by the reception antenna 12. The vertical angle deriving part 18e derives the vertical angle of the substance TA above the road positioned at the upper side (+z side) in the height direction (z-axis direction) of the vehicle CR by the reflection wave D21 received by the reception antenna 12.

As well as the transmission antenna 11b, in a case where the substance TA above the road exists within the range of the transmission ranges Tr3 and Tr4 of the transmission antennas 11c and 11d, the reflection wave from the substance TA above the road is received by the reception antenna 12. The vertical angle deriving part 18e derives the vertical angle of the substance TA above the road at the upper side (+z side) of the height direction (z-axis direction) of the vehicle CR by the reflection wave received by the reception antenna 12.

Next, the reception signal RS and the combination of the transmission antenna 11 and the reception antenna 12 used when the vertical angle is derived will be described.

Figure 13:
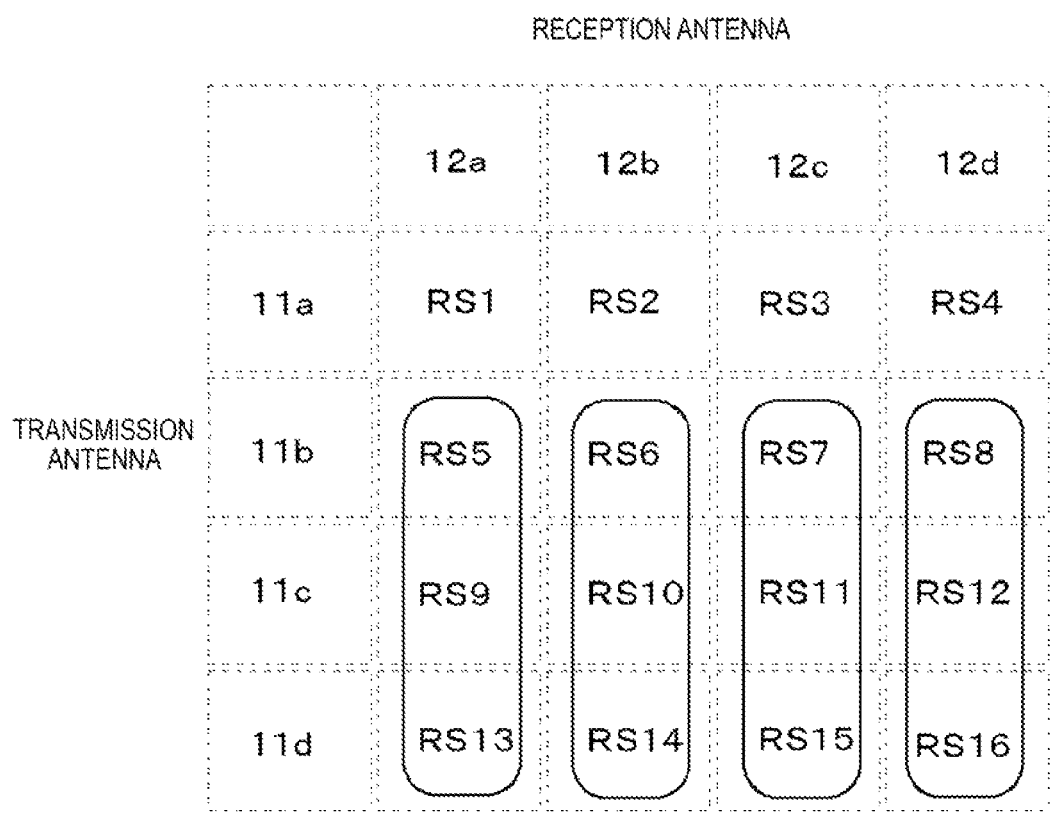
FIG. 13 is a table illustrating receiving signals corresponding to each transmission antenna and each reception antenna in a second period.

FIG. 13 is a table illustrating the respective receiving signals RS1 to RS16 corresponding to the respective transmission antennas 11a to 11d of the transmission antenna 11, and the respective reception antennas 12a to 12d of the reception antenna 12 in the second period Tx11. In FIG. 13, a vertical axis represents the transmission antennas 11a to 11d, and a vertical axis represents the reception antennas 12a to 12d. FIG. 13 shows the respective receiving signals RS1 to RS16 corresponding to the respective transmission antennas 11a to 11d and the respective reception antennas 12a to 12d. That is, FIG. 13 shows that the receiving signal RS is a signal based on the reflection signal received by any antenna. In other words, it shows that the receiving signal RS is a receiving signal based on the transmission wave outputted from any transmission antenna. For example, the receiving signal RS1 is a receiving signal based on the reflection wave received by the reception antenna 12a. The receiving signal RS1 is a signal based on the reflection signal of the transmission wave outputted from the transmission antenna 11a which is reflected from the target. Further, the receiving signal RS2 is a receiving signal based on the reflection wave received by the reception antenna 12b. The receiving signal RS5 is a signal based on the reflection signal of the transmission wave outputted from the transmission antenna 11b which is reflected from the target.

FIG. 13 shows 16 receiving signals RS1 to RS16 corresponding to four transmission antennas 11a to 11d and four reception antennas 12a to 12d. That is, the receiving signal received during the second period Tx11 is shown. The vertical angle deriving part 18e sets the receiving signals RS5, RS9 as one set, and generates other three sets. That is, the vertical angle deriving part 18e generates three sets of "RS6, RS10, and RS14 ", "RS7, Rs11, and RS15 ", and "RS8, RS12, and RS16". The vertical angle deriving part 18e derives the vertical angles of two targets positioned at the substantially same vertical distance from the phase difference of one set of three receiving signals RS, by use of the given angle estimation method.

For example, the vertical angle deriving part 18e derives the vertical angle of the substance TA above the road from the phase difference of "RS5, RS9, and RS13" by use of the ESPRIT which is the angle estimation method. In this instance, the vertical angle is respectively derived from the respective four sets. For this reason, the vertical angle deriving part 18e derives a value obtained by averaging the tour sets of vertical angles, as the vertical angle Φ of the substance TA above the road. Further, the height of the substance TA above the road in the direction perpendicular to the road surface is derived from the information about the vertical angle Φ of the substance TA above the road and the vertical distance of the substance TA above the road by the calculation using the trigonometric function. The radar apparatus 10 outputs the target information including the position of the substance TA above the road in the horizontal direction, the height of the substance TA above the road in the vertical direction, and its relative speed to the vehicle control device 20.

Similar to the vertical angle described above, the horizontal angle is also derived from the phase difference between the plurality of receiving signals RS. FIG. 14 is a table illustrating the respective receiving signals RS1 to RS16 corresponding to the respective transmission antennas 11a to 11d of the transmission antenna 11, and the respective reception antennas 12a to 12d of the reception antenna 12 in the first period 1×10. Specifically, in the upper drawing in FIG. 14, a vertical axis represents the transmission antennas 11a and 11c, and a horizontal axis represents the reception antennas 12a to 12d. The respective receiving signals R1 to R8 are shown in the lower table of FIG. 14. In the lower drawing in FIG. 14, a vertical axis represents the transmission antennas 11a to 11d, and a horizontal axis represents the reception antennas 12a to 12d. The respective receiving signals R1 to R16 are shown in the lower table of FIG. 14.

The respective receiving signals R1 to R8 in the upper drawing of FIG. 14 is a signal received during the first period Tx10. The vertical angle deriving part 18e generates two different sets, one set of "RS1, RS2, RS3, and RS4" and one set of "RS5, RS6, RS7, and RS8". The horizontal angle deriving part 18c derives, for example, the horizontal angle of the substance TA above the road from the phase difference of one set of four receiving signals by use of a given angle estimation method.

The horizontal angle deriving part 18c derives the horizontal angle of the substance TA above the road from the phase difference of "RS1, RS2, RS3, and RS4" by use of the ESPRIT which is the angle estimation method. As a result, the substance TA above the road exists within the angle of the transmission range of the transmission antenna 11a.

According to the position of the substance TA above the road, there are a case where the substance TA above the road is contained in only the transmission range Tr1 of the transmission antenna 11a, and a case where the substance TA above the road is contained in the transmission range Tr1 and the transmission antenna 11c. For example, the case where the substance TA above the road is contained in only the transmission range Tr1 of the transmission antenna 11a is as follows. The distance between the vehicle CR and the substance TA above the road is a relatively close distance (e.g., 30 m), and the target is positioned at the oblique right side (horizontal angle of 35 degrees of the second reference axis Ce) of the vehicle CR. Further, the example of the case where the substance TA above the road is contained in the transmission range Tr1 and the transmission antenna 11c is as follows. The distance between the vehicle CR and the substance TA above the road is a relatively close distance (e.g., 30 m), and the target is positioned directly in front (horizontal angle of ±0 degree of the second reference axis Ce) of the vehicle CR.

Further, the horizontal angle of the substance TA above the road is derived based on the phase difference of the receiving signals received by the respective antennas 12a to 12d of the reception antenna 12. For example, if the reception antenna 12a is set as a reference antenna 12a, the horizontal angle of the substance TA above the road is derived based on the phase difference of the reception antennas 12a and 12b. The phase difference of the reception antennas 12a and 12b in the case where the substance TA above the road is contained in only the transmission range Tr1 is set as 0 degree. Further, the phase difference of the reception antennas 12a and 12b in the case where the substance TA above the road is contained in the transmission ranges Tr1 and Tr3 is set as 360 degrees. In this instance, the phase difference of 360 degrees is equal to the phase difference of 0 degree since the phase is folded. As a result, it is possible to judge whether the substance TA above the road exists directly in front (horizontal angle of ±0) of the vehicle CR, or whether the substance TA above the road is positioned at the oblique right side (horizontal angle of 35 degrees) of the vehicle CR.

To prevent false detection of the horizontal angle due to the folding of the phase, the correct angle of the target is derived by use of the transmission antennas 11a and 11c of which the output directions of the transmission waves are deviated from side to side in the horizontal direction. For example, the peak signal of the FIT data of the transmission antenna 11a is derived at a certain frequency (e.g., 100 kHz). The phase difference of the peak signals is 0 degree. By contrast, the peak signal of the FFT data of the transmission antenna 11c is derived at a certain frequency (e.g., 100 kHz). However, if the phase difference of the peak signals is not 0 degree, the substance TA above the road exists in only the transmission range Tr1. That is, in the case where the substance TA above the road is derived in only in the transmission range Tr1 of the transmission antenna 11a, the substance TA above the road exists at the horizontal angle of +35 degrees.

The peak signal of the FFT data of the transmission antenna 11a is derived at a certain frequency (e.g., 100 kHz). The phase difference of the peak signals is 0 degree. And, the peak signal of the FFT data of the transmission antenna 11c is derived at a certain frequency (e.g., 100 kHz). The phase difference of the peak signals is 0 degree. In this instance, the substance TA above the road exists in the transmission range Tr1 and the transmission range Tr3. That is, in the case where the substance TA above the road is derived in only in the transmission range Tr1 of the transmission antenna 11a and the transmission range Tr3 of the transmission antenna 11c, the substance TA above the road exists at the horizontal angle of 0 degree. In this way, the radar apparatus 10 prevents the false detection of the horizontal angle of the target due to the folding of the phase, by use of the plurality of transmission antennas with the different transmission range.

The respective receiving signals R1 to R16 in the lower drawing of FIG. 14 is a signal received during the second period Tx11. The horizontal angle deriving part 18c sets "RS1, RS2, RS3, and RS4" as one set, and generates other three sets. That is, the horizontal angle deriving part 18c generates three sets of "RS5, RS6. RS7, and RS8", "RS9, RS10. RS11, and RS12", and "RS13, RS14, RS15, and RS16". The horizontal angle deriving part 18c derives the horizontal angles of the substance TA above the road from the phase difference of one set of four receiving signals, by use of the given angle estimation method. For example, the horizontal angle deriving part 18c derives the horizontal angle of the substance TA above the road from the phase difference of "RS1, RS2, RS3, and RS4" by use of the ESPRIT which is the angle estimation method. The horizontal angle is derived from each of the four sets. For this reason, the horizontal angle deriving part 18c derives the value obtained by averaging the horizontal angles of the four sets as the horizontal angle of the substance TA above the road.

Similar to the above description, the radar apparatus 10 prevents the false detection of the horizontal angle of the target due to the folding of the phase, by use of the plurality of transmission antennas with the different transmission range.

The horizontal angle deriving part 18c derives the angle of the target in the horizontal direction by the receiving signal illustrated in FIGS. 13 and 14. For example, the horizontal angle deriving part 18c derives the angle of the preceding vehicle and the substance TA above the road in the horizontal direction. The vertical angle deriving part 18e derives the angle of the target in the vertical direction. For example, the vertical angle deriving part 18e derives the angle of the preceding vehicle and the substance TA above the road in the vertical direction.

<3. Processing Flowchart>

Figure 15:
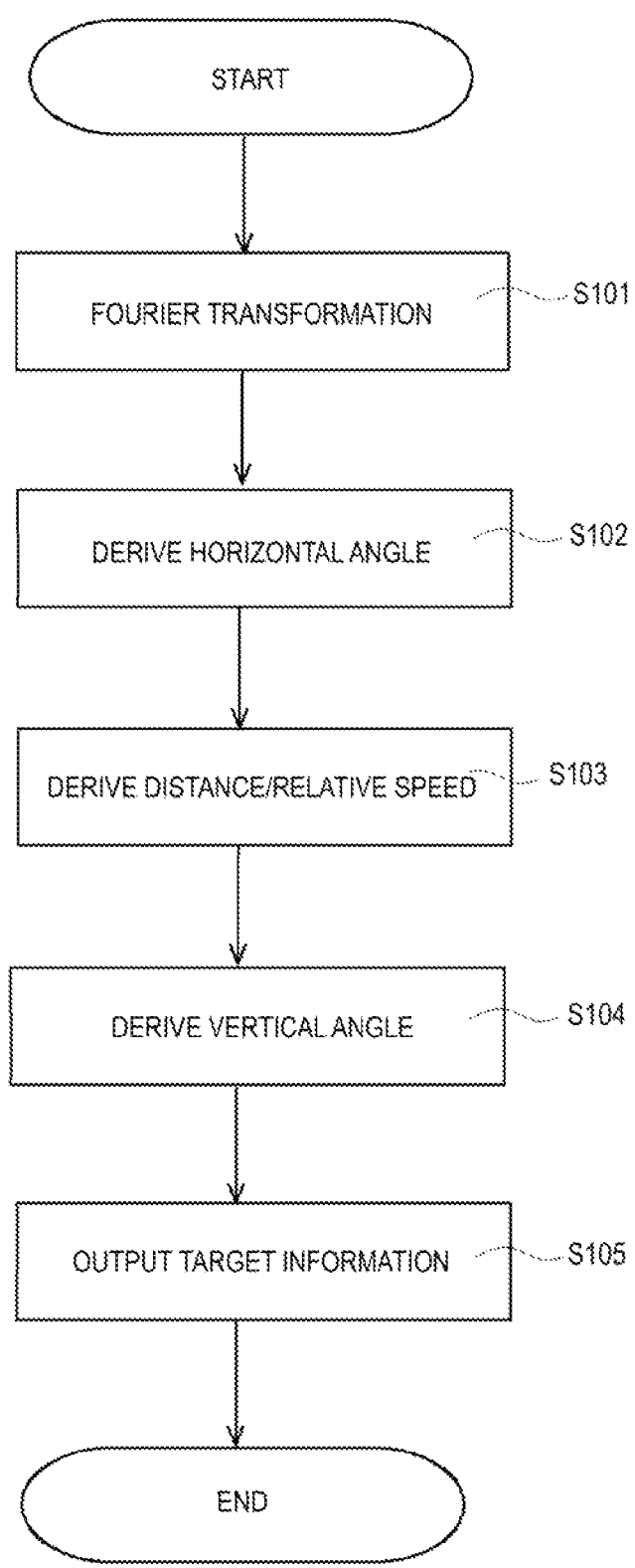
FIG. 15 is a flowchart of the radar apparatus.

Next, the processing of the radar apparatus 10 will be described with reference to FIG. 15. FIG. 15 is a processing flowchart of the radar apparatus 10. The Fourier transforming part 18a of the radar apparatus 10 decomposes the signal for each frequency by FFT-processing the digital signal outputted from the AD converter 14 (step S101).

The horizontal angle deriving part 18c derives the horizontal angle by use of the given angle estimation method (step S102). The vertical distance/relative speed deriving part 18d pairs the peaks signals to derive the vertical distance of the relative speed of the target corresponding to the paired data (step S103).

The vertical angle deriving part 18e derives the angle of the target in the direction perpendicular to the road surface (step S104). The signal processing unit 18 outputs the target information to the vehicle control device 20 (step S105). Among the targets derived in step S102 and step S103, the target judged as the substance TA above the road from the angle of the vertical direction in step S104 is excluded from the ACC control and the PCS control. For this reason, the radar apparatus 10 outputs the target information except for the substance TA above the road to the vehicle control device 20. Therefore, the radar apparatus 10 can derive the position of the target in the horizontal direction to the road surface, and the height of the target in the direction perpendicular to the road surface.

<Modified Examples>

Hereinbefore, the embodiments of the present invention have been described. However, the present invention is not limited to those embodiments, and various modified examples may be made. Hereinafter, such modified examples will be described. On the other hand, all forms, including forms described in the above-described embodiments and forms to be described hereinafter, can be appropriately combined.

In the above embodiment, the length values and the width values of the dielectric substrate 102, the transmission antenna 11, and the reception antenna 12 of the antenna 101 are one example, and other values are available.

In the above embodiment, although it has been described that the number of the transmission antennas 11 and the reception antennas 12 are four, respectively, the number of the transmission antennas 11 and the number of the reception antennas 12 are not limited thereto 4.

In the above embodiment, it has been described that the transmission wave is outputted from the transmission antenna 11a and the transmission antenna 11c in order in the first period Tx10. Further, it has been described that the transmission wave is outputted from the transmission antenna 11a, the transmission antenna 11b, the transmission antenna 11c, and the transmission antenna 11d in order in the second period Tx11. The output order of the transmission wave in the first period Tx10 and the second period Tx11 is one example. As other example, in the first period Tx10, the transmission wave may be outputted from the transmission antenna 11c and the transmission antenna 11a in order, for example. In the second period Tx11, the transmission wave may be outputted from the transmission antenna 11a, the transmission antenna 11d, the transmission antenna 11c, and the transmission antenna 11b in order. That is, as long as the order can derive the position of the target in the horizontal direction and the height of the target in the vertical direction, any order to output the transmission wave from the transmission antenna 11 is available.

In the above embodiment, it has been described that the angle, of which the reference axis Ce is set to ±0, to the range of the transmission ranges Tr1 to Tr4 is represented by a concrete value. The value of the angle is one example, and other value may be used as the angle.

In the above embodiment, it has been described that the conversion from the transmission antenna 11c to the transmission antenna 11a in the second period Tx11 which is the period next to the first period Tx10 is performed during time t3 to time t3a. In other words, it has been described that the conversion from the transmission antenna 11c to the transmission antenna 11a is performed after the target deriving process of the first period Tx10 is completed. By contrast, the conversion from the transmission antenna 11c to the transmission antenna 11a may be performed within a given time from the time t2. That is, the conversion from the transmission antenna 11c to the transmission antenna 11a may be performed before the processing of the first processing period Tx5 starts. It has been described that the conversion from the transmission antenna 11d to the transmission antenna 11a in the first period Tx10 which is the period next to the second period Tx11 is performed during time t8 to time t8a. In other words, it has been described that the conversion from the transmission antenna 11d to the transmission antenna 11a is performed after the target deriving process of the second period Tx11 is completed. By contrast, the conversion from the transmission antenna 11d to the transmission antenna 11a may be performed within a given time from the time t7. That is, the conversion from the transmission antenna 11d to the transmission antenna 11a may be performed before the processing of the second processing period Tx5a starts. Further, it has been described that the angle estimation method employed by the radar apparatus 10 is the ESPRIT as an example. However, any one of angle estimation methods, such as DBF (Digital Beam Forming), PRISM (Propagator method based on an Improved Spatial-smoothing Matrix), and MUSIC (Multiple Signal Classification), may be used.

Further, in the above embodiment, the radar apparatus 10 may be applied to other appliances, in addition to the vehicle Cr. The radar apparatus 10 may be applied to any one of flying airplanes and sailing vessels, for example.

What is claimed is:

1. An antenna including a plurality of transmission antennas and a plurality of reception antennas, the antenna comprising:
   a first transmission antenna;
   a third transmission antenna provided at a position shifted in a short direction of the first transmission antenna;
   a second transmission antenna provided at a position between the first transmission antenna and the third transmission antenna so that a portion of the second transmission antenna in a longitudinal direction is overlapped with a portion of the first and third transmission antennas in the longitudinal direction;
   a fourth transmission antenna provided at a position point-symmetrical with respect to the position of the second transmission antenna, about the position of the third transmission antenna; and
   the plurality of reception antennas provided so that a portion of each of the reception antennas in the longitudinal direction is overlapped with a portion of the second transmission antenna in the longitudinal direction.

2. The antenna according to claim 1,
   wherein the first transmission antenna and the third transmission antenna output a transmission wave of a first range, and
   wherein the second transmission antenna and the fourth transmission antenna output a transmission wave of a second range of which a horizontal angle is narrower than that of the first range.

3. A radar apparatus including the antenna set forth in claim 1, the radar apparatus comprising:
   a first deriving unit configured to derive a position of a target in a horizontal direction with respect to a road surface based on reflection waves of transmission waves outputted from the first transmission antenna and the third transmission antenna, from the target; and
   a second deriving unit configured to derive a height of the target in a vertical direction with respect to the road surface based on reflection waves of transmission waves outputted from the second transmission antenna, the third transmission antenna and the fourth transmission antenna, from the target.

4. The radar apparatus according to claim 3,
   wherein a first period including a period to output the transmission waves from the first transmission antenna and the third transmission antenna in order, and a second period including a period to output the transmission waves from the first transmission antenna, the second transmission antenna, the third transmission antenna, and the fourth transmission antenna in order are set to one cycle of a process of deriving the position of the target in the horizontal position and the height of the target in the vertical direction,
   wherein the first deriving unit derives the position of the target in the horizontal direction based on the reflection waves from the target during the first period and the second period, and
   wherein the second deriving unit derives the height of the target in the vertical direction based on the reflection waves from the target during the second period.

5. A vehicle control system capable of controlling a vehicle, comprising:
   the radar apparatus set forth in claim 3; and
   a vehicle control device configured to control the vehicle based on target information outputted from the radar apparatus.

6. A signal processing method of deriving a position of a target by a reflection wave received with a plurality of reception antennas provided on a substrate surface of a dielectric substrate, the signal processing method comprising:
   outputting a transmission wave by an antenna including a plurality of transmission antennas and the plurality of reception antennas, with using a first transmission antenna, a third transmission antenna provided at a position shifted in a short direction of the first transmission antenna, a second transmission antenna provided at a position between the first transmission antenna and the third transmission antenna so that a portion of the second transmission antenna in a longitudinal direction is overlapped with a portion of the first and third transmission antennas in the longitudinal direction, and a fourth transmission antenna provided at a position point-symmetrical with respect to the position of the second transmission antenna, about the position of the third transmission antenna;

receiving the reflection wave with using the plurality of reception antennas provided so that a portion of each of the reception antennas in the longitudinal direction is overlapped with a portion of the second transmission antenna in the longitudinal direction;

deriving a position of the target in a horizontal direction with respect to a road surface, based on reflection waves of transmission waves outputted from the first transmission antenna and the third transmission antenna from the target; and deriving a height of the target in a vertical direction with respect to the road surface, based on reflection waves of transmission waves outputted from the second transmission antenna, the third transmission antenna and the fourth transmission antenna from the target.

7. The antenna according to claim 1, wherein a width of the second and fourth transmission antennas is greater than a width of the first and third transmission antennas.

8. The signal processing method according to claim 6, wherein a width of the second and fourth transmission antennas is greater than a width of the first and third transmission antennas.

* * * * *